(12) United States Patent
Lee et al.

(10) Patent No.: US 9,729,866 B2
(45) Date of Patent: Aug. 8, 2017

(54) METHOD OF DISPLAYING A STEREOSCOPIC IMAGE AND DISPLAY DEVICE

(71) Applicant: Samsung Display Co., Ltd., Yongin, Gyeonggi-do (KR)

(72) Inventors: Jae-Hoon Lee, Seoul (KR); Woo-Chul Kim, Seoul (KR); Do-Hyung Ryu, Yongin-si (KR); Jae-Woo Song, Anyang-si (KR); Hae-Goo Jung, Yongin-si (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 294 days.

(21) Appl. No.: 14/574,204

(22) Filed: Dec. 17, 2014

(65) Prior Publication Data

US 2016/0014402 A1    Jan. 14, 2016

(30) Foreign Application Priority Data

Jul. 8, 2014    (KR) .......................... 10-2014-0085479

(51) Int. Cl.
*G09G 5/18*    (2006.01)
*H04N 13/04*    (2006.01)

(52) U.S. Cl.
CPC ........... *H04N 13/0497* (2013.01); *G09G 5/18* (2013.01); *H04N 13/0438* (2013.01)

(58) Field of Classification Search
CPC .............................. G09G 5/18; H04N 13/0438
USPC ......................................................... 345/690
See application file for complete search history.

(56) References Cited

U.S. PATENT DOCUMENTS

| 2013/0002653 A1* | 1/2013 | Lee ..................... H04N 13/0438 345/419 |
| 2013/0027525 A1* | 1/2013 | Kitayama .......... G02B 27/2264 348/54 |
| 2013/0057791 A1* | 3/2013 | Kitayama .............. G09G 3/003 349/15 |
| 2013/0215157 A1* | 8/2013 | Shin ....................... G09G 3/003 345/690 |

(Continued)

FOREIGN PATENT DOCUMENTS

| KR | 10-2013-0095040 A | 8/2013 |
| KR | 10-2014-0013472 A | 2/2014 |
| KR | 10-2015-0070682 A | 6/2015 |

*Primary Examiner* — Carolyn R Edwards
(74) *Attorney, Agent, or Firm* — Knobbe, Martens, Olson & Bear, LLP

(57) ABSTRACT

A method of displaying a stereoscopic image and a display device are disclosed. In one aspect, the method includes sequentially writing black data to a portion of the pixel rows during a portion of a first frame period and sequentially writing left eye image data to the pixel rows during the remaining portion of the first frame period and during a second frame period. The method also includes driving the pixel rows to simultaneously emit light during a first emission period, sequentially writing the black data to the portion of the pixel rows during a portion of a third frame period, and sequentially writing right eye image data to the pixel rows during the remaining portion of the third frame period and during a fourth frame period. The method further includes driving the pixel rows to simultaneously emit light during a second emission period corresponding to the fourth frame period.

20 Claims, 16 Drawing Sheets

(56) References Cited

U.S. PATENT DOCUMENTS

2014/0028736 A1* 1/2014 Chen .................... G09G 3/3611
                                                      345/690
2014/0028740 A1* 1/2014 Shin ....................... H04N 13/04
                                                      345/691

* cited by examiner

FIG. 6

| ROW | UNIT1 | | | | UNIT2 | | | | UNIT3 | | | | UNIT4 | | | | UNIT5 | | | | UNIT6 | | | |
|---|---|---|---|---|---|---|---|---|---|---|---|---|---|---|---|---|---|---|---|---|---|---|---|---|
| 1 | ① | 1 | 1 | 1 | 1 | 1 | 1 | 1 | 1 | 1 | 1 | 1 | 1 | 1 | 1 | 2 | 2 | 1 | 1 | ③ | 3 | 2 | ③ | 4 |
| 2 | 3 | 3 | ④ | 4 | ① | 3 | 3 | 4 | 1 | 3 | 4 | 4 | 1 | 1 | ④ | 2 | 1 | 2 | 2 | 2 | 2 | ② | 2 | ③ |
| 3 | 2 | 2 | 2 | ③ | 3 | 2 | ④ | ③ | ① | 3 | 2 | ③ | 1 | 1 | 2 | 2 | 1 | ② | 2 | 2 | 1 | 2 | 2 | 2 |
| 4 | 1 | ② | 2 | 2 | ② | 2 | 2 | 2 | 3 | 2 | 2 | 2 | ① | 1 | 1 | 1 | 1 | 1 | 1 | 1 | 1 | ② | 1 | 1 |
| 5 | 1 | 1 | 1 | 1 | 1 | 1 | 1 | 1 | 3 | 2 | 2 | 2 | 3 | ④ | 4 | 4 | ① | 1 | 1 | 1 | 1 | 1 | 1 | 1 |
| 6 | 1 | 1 | 1 | 1 | 1 | 1 | 1 | 1 | 2 | 2 | 2 | 2 | 2 | 2 | ③ | 2 | 3 | ④ | 4 | 4 | ① | 1 | 1 | 1 |

METHOD OF DISPLAYING A STEREOSCOPIC IMAGE AND DISPLAY DEVICE

CROSS-REFERENCE TO RELATED APPLICATIONS

This application claims priority under 35 USC §119 to Korean Patent Applications No. 10-2014-0085479, filed on Jul. 8, 2014 in the Korean Intellectual Property Office (KIPO), the contents of which are incorporated herein in its entirety by reference.

BACKGROUND

Field

The described technology generally related to a method of displaying stereoscopic images and a display device displaying stereoscopic images.

Description of the Related Technology

One method of displaying a stereoscopic image (or a three-dimensional (3D) image) includes using binocular parallax to provide a three-dimensional effect. A stereoscopic (or three-dimensional) display displays the stereoscopic image by providing different images to the left and right eyes of a viewer, with or without the use of stereoscopic glasses. One widely used type of stereoscopic display that includes the user wearing glasses is a shutter glasses type display in which the left eye lens of the shutter glasses is open when displaying a left eye image on the display and the right eye lens of the shutter glasses is open when displaying a right eye image.

SUMMARY OF CERTAIN INVENTIVE ASPECTS

One inventive aspect is a method of displaying a stereoscopic image that can prevent crosstalk between a left eye image and a right eye image.

Another aspect is a display device that can prevent crosstalk between a left eye image and a right eye image.

Another aspect is a method of displaying a stereoscopic image in a display device having a display panel including a plurality of pixel rows. In the method, black data is sequentially written to a portion of the pixel rows during a portion of a first frame period, left eye image data is sequentially written to the pixel rows during the remaining portion of the first frame period and during a second frame period, the pixel rows are driven to simultaneously emit light during a first emission period corresponding to the second frame period, the black data is sequentially written to the portion of the pixel rows during a portion of a third frame period, right eye image data is sequentially written to the pixel rows during the remaining portion of the third frame period and during a fourth frame period, and the pixel rows are driven to simultaneously emit light during a second emission period corresponding to the fourth frame period.

In example embodiments, each of the portion of the first frame period and the portion of the third frame period may correspond to an emission end delay period.

In example embodiments, the display device may drive the display panel by diving one frame period into first through N-th sub-frame periods, where N is an integer greater than 1, and the portion of the first frame period during which the black data is sequentially written to the portion of the pixel rows may be a portion of a first sub-frame period of the first frame period.

In example embodiments, to sequentially write the left eye image data to the pixel rows during the remaining portion of the first frame period and during the second frame period, the left eye image data may be sequentially written to the remaining portion of the pixel rows during the remaining portion of the first sub-frame period of the first frame period, the left eye image data may be sequentially written to the pixel rows during respective second through N-th sub-frame periods of the first frame period, and the left eye image data may be sequentially written to the pixel rows during respective first through N-th sub-frame periods of the second frame period.

In example embodiments, the black data, the left eye image data and the right eye image data may be written to the pixel rows in a progressive emission with simultaneous scan (PESS) method.

In example embodiments, first and second power supply voltages having a first voltage difference may be applied to the pixel rows during a first non-emission time corresponding to the first frame period and during a second non-emission time corresponding to the third frame period such that the pixel rows do not emit light, and the first and second power supply voltages having a second voltage difference greater than the first voltage difference may be applied to the pixel rows during the first emission time and during the second emission time such that the pixel rows emit light.

In example embodiments, the first power supply voltage may be a high power supply voltage, and the second power supply voltage may be a low power supply voltage, and the low power supply voltage may rise to a high voltage level at a start time of the first non-emission period, may fall to a low voltage level at a start time of the first emission period, may rise to the high voltage level at a start time of the second non-emission period, and may fall to the low voltage level at a start time of the second emission period.

In example embodiments, each of the portion of the first frame period and the portion of the third frame period may correspond to a rising time during which the low power supply voltage rises from the low voltage level to the high voltage level.

In example embodiments, the first power supply voltage may be a high power supply voltage, and the second power supply voltage may be a low power supply voltage, and the high power supply voltage may fall to a low voltage level at a start time of the first non-emission period, may rise to a high voltage level at a start time of the first emission period, may fall to the low voltage level at a start time of the second non-emission period, and may rise to the high voltage level at a start time of the second emission period.

In example embodiments, each of the portion of the first frame period and the portion of the third frame period may correspond to a falling time during which the high power supply voltage falls from the high voltage level to the low voltage level.

In example embodiments, an emission control signal having a first voltage level may be applied to the pixel rows during a first non-emission period corresponding to the first frame period and during a second non-emission period corresponding to the third frame period such that the pixel rows do not emit light, and the emission control signal having a second voltage level may be applied to the pixel rows during the first emission period and during the second emission period such that the pixel rows emit light.

In example embodiments, each of the portion of the first frame period and the portion of the third frame period may correspond to a transition time during which the emission control signal transitions from the second voltage level to the first voltage level.

In example embodiments, the display panel may include an upper display panel having upper pixel rows of the pixel rows and a lower display panel having lower pixel rows of the pixel rows, and the upper display panel and the lower display panel may be respectively driven by different data drivers.

In example embodiments, the black data, the left eye image data and the right eye image data may be sequentially written to the upper pixel rows in a first direction from top to bottom of the upper display panel, and the black data, the left eye image data and the right eye image data may be sequentially written to the lower pixel rows in the first direction from top to bottom of the lower display panel.

In example embodiments, the black data, the left eye image data and the right eye image data may be sequentially written to the upper pixel rows in a first direction from top to bottom of the upper display panel, and the black data, the left eye image data and the right eye image data may be sequentially written to the lower pixel rows in a second direction from bottom to top of the lower display panel.

According to some example embodiments, there is provided a display device include a display panel including a plurality of pixel rows, and a driving unit configured to sequentially write black data to a portion of the pixel rows during a portion of a first frame period, to sequentially write left eye image data to the pixel rows during the remaining portion of the first frame period and during a second frame period, to drive the pixel rows to simultaneously emit light during a first emission period corresponding to the second frame period, to sequentially write the black data to the portion of the pixel rows during a portion of a third frame period, to sequentially write right eye image data to the pixel rows during the remaining portion of the third frame period and during a fourth frame period, and to drive the pixel rows to simultaneously emit light during a second emission period corresponding to the fourth frame period.

In example embodiments, each of the portion of the first frame period and the portion of the third frame period may correspond to an emission end delay period.

In example embodiments, the driving unit may includes a power supply unit configured to apply first and second power supply voltages having a first voltage difference to the pixel rows during a first non-emission period corresponding to the first frame period and during a second non-emission period corresponding to the third frame period such that the pixel rows do not emit light, and to apply the first and second power supply voltages having a second voltage difference greater than the first voltage difference to the pixel rows during the first emission period and during the second emission period such that the pixel rows emit light, and each of the portion of the first frame period and the portion of the third frame period may correspond to a transition time of at least one of the first and second power supply voltages.

In example embodiments, the driving unit may includes an emission control unit configured to apply an emission control signal having a first voltage level to the pixel rows during a first non-emission period corresponding to the first frame period and during a second non-emission period corresponding to the third frame period such that the pixel rows do not emit light, and to apply the emission control signal having a second voltage level to the pixel rows during the first emission time and during the second emission time such that the pixel rows emit light, and wherein each of the portion of the first frame period and the portion of the third frame period may correspond to a transition time during which the emission control signal transitions from the second voltage level to the first voltage level.

In example embodiments, the display panel may include an upper display panel having upper pixel rows of the pixel rows and a lower display panel having lower pixel rows of the pixel rows, and the upper display panel and the lower display panel are respectively driven by different data drivers included in the driving unit. The black data, the left eye image data and the right eye image data may be sequentially written to the upper pixel rows in a first direction from top to bottom of the upper display panel, and the black data, the left eye image data and the right eye image data may be sequentially written to the lower pixel rows in a second direction from bottom to top of the lower display panel.

Another aspect is a method of displaying a stereoscopic image in a display device having a display panel including a plurality of pixel rows, the method comprising sequentially writing black data to a portion of the pixel rows during a portion of a first frame period; sequentially writing left eye image data to the pixel rows during the remaining portion of the first frame period and during a second frame period; driving the pixel rows to simultaneously emit light during a first emission period corresponding to the second frame period; sequentially writing the black data to the portion of the pixel rows during a portion of a third frame period; sequentially writing right eye image data to the pixel rows during the remaining portion of the third frame period and during a fourth frame period; and driving the pixel rows to simultaneously emit light during a second emission period corresponding to the fourth frame period.

In example embodiments, each of the portions of the first and third frame periods corresponds to an emission end delay period. Each frame period can be divided into first through N-th sub-frame periods, where N is an integer greater than 1 and the portion of the first frame period can be a portion of the first sub-frame period of the first frame period.

In example embodiments, the sequentially writing the left eye image data to the pixel rows during the remaining portion of the first frame period and during the second frame period includes sequentially writing the left eye image data to the remaining portion of the pixel rows during the remaining portion of the first sub-frame period of the first frame period; sequentially writing the left eye image data to the pixel rows during the second through N-th sub-frame periods of the first frame period; and sequentially writing the left eye image data to the pixel rows during the first through N-th sub-frame periods of the second frame period. The black data, the left eye image data and the right eye image data can be written to the pixel rows via a progressive emission with simultaneous scan (PESS) method.

In example embodiments, the method further comprises applying first and second power supply voltages having a first voltage difference to the pixel rows i) during a first non-emission period corresponding to the first frame period and ii) during a second non-emission period corresponding to the third frame period such that the pixel rows do not emit light; and applying the first and second power supply voltages having a second voltage difference greater than the first voltage difference to the pixel rows i) during the first emission period and ii) during the second emission period such that the pixel rows emit light.

In example embodiments, the first power supply voltage is a high power supply voltage, wherein the second power supply voltage is a low power supply voltage, and wherein the method further comprises raising the low power supply voltage rises to a high voltage level at a start time of the first non-emission period; lowering the lower power supply voltage to a low voltage level at a start time of the first emission period; raising the lower power supply voltage to the high voltage level at a start time of the second non-emission period; and lowering the lower power supply voltage to the low voltage level at a start time of the second emission period. Each of the portions of the first and third frame periods can correspond to a rising time during which the low power supply voltage rises from the low voltage level to the high voltage level.

In example embodiments, the first power supply voltage is a high power supply voltage, wherein the second power supply voltage is a low power supply voltage, and wherein the method further comprises lowering the high power supply voltage to a low voltage level at a start time of the first non-emission period; raising the high power supply voltage to a high voltage level at a start time of the first emission period; lowering the high power supply voltage to the low voltage level at a start time of the second non-emission period; and raising the high power supply voltage to the high voltage level at a start time of the second emission period. Each of the portions of the first and third frame periods can correspond to a falling time during which the high power supply voltage falls from the high voltage level to the low voltage level.

In example embodiments, the method further comprises applying an emission control signal having a first voltage level to the pixel rows i) during a first non-emission period corresponding to the first frame period and ii) during a second non-emission period corresponding to the third frame period such that the pixel rows do not emit light; and applying the emission control signal having a second voltage level to the pixel rows i) during the first emission period and ii) during the second emission period such that the pixel rows emit light. Each of the portions of the first and third frame periods can correspond to a transition time during which the emission control signal transitions from the second voltage level to the first voltage level.

In example embodiments, the display panel includes an upper display panel having upper pixel rows of the pixel rows and a lower display panel having lower pixel rows of the pixel rows and wherein the upper display panel and the lower display panel are respectively driven by different data drivers. The black data, the left eye image data and the right eye image data can be sequentially written to the upper pixel rows in a first direction from the top to the bottom of the upper display panel and the black data, the left eye image data and the right eye image data can be sequentially written to the lower pixel rows in the first direction from the top to the bottom of the lower display panel. The black data, the left eye image data and the right eye image data can be sequentially written to the upper pixel rows in a first direction from the top to the bottom of the upper display panel and the black data, the left eye image data and the right eye image data can be sequentially written to the lower pixel rows in a second direction from the bottom to the top of the lower display panel.

Another aspect is a display device comprising a display panel including a plurality of pixel rows; and a driving unit configured to: sequentially write black data to a portion of the pixel rows during a portion of a first frame period; sequentially write left eye image data to the pixel rows during the remaining portion of the first frame period and during a second frame period; drive the pixel rows to simultaneously emit light during a first emission period corresponding to the second frame period; sequentially write the black data to the portion of the pixel rows during a portion of a third frame period; sequentially write right eye image data to the pixel rows during the remaining portion of the third frame period and during a fourth frame period; and drive the pixel rows to simultaneously emit light during a second emission period corresponding to the fourth frame period.

In example embodiments, each of the portions of the first and third frame periods corresponds to an emission end delay period.

In example embodiments, the driving unit includes a power supply configured to: apply first and second power supply voltages having a first voltage difference to the pixel rows i) during a first non-emission period corresponding to the first frame period and ii) during a second non-emission period corresponding to the third frame period such that the pixel rows do not emit light; and apply the first and second power supply voltages having a second voltage difference greater than the first voltage difference to the pixel rows i) during the first emission period and ii) during the second emission period such that the pixel rows emit light, wherein each of the portions of the first and third frame periods corresponds to a transition time of at least one of the first and second power supply voltages.

In example embodiments, the driving unit includes an emission controller configured to: apply an emission control signal having a first voltage level to the pixel rows i) during a first non-emission period corresponding to the first frame period and ii) during a second non-emission period corresponding to the third frame period such that the pixel rows do not emit light; and apply the emission control signal having a second voltage level to the pixel rows i) during the first emission period and ii) during the second emission period such that the pixel rows emit light, wherein each of the portions of the first and third frame periods corresponds to a transition time during which the emission control signal transitions from the second voltage level to the first voltage level.

In example embodiments, the display panel includes an upper display panel having upper pixel rows of the pixel rows and a lower display panel having lower pixel rows of the pixel rows, wherein the driving unit includes two data drivers respectively configured to drive the upper display panel and the lower display panel, wherein the black data, the left eye image data and the right eye image data are sequentially written to the upper pixel rows in a first direction from the top to the bottom of the upper display panel, and wherein the black data, the left eye image data and the right eye image data are sequentially written to the lower pixel rows in a second direction from the bottom to the top of the lower display panel.

BRIEF DESCRIPTION OF THE DRAWINGS

Illustrative, non-limiting example embodiments will be more clearly understood from the following detailed description taken in conjunction with the accompanying drawings.

FIG. 6 is a diagram for describing an example of a method of writing data to pixel rows in a display device according to example embodiments.

DETAILED DESCRIPTION OF CERTAIN INVENTIVE EMBODIMENTS

Figure 1:
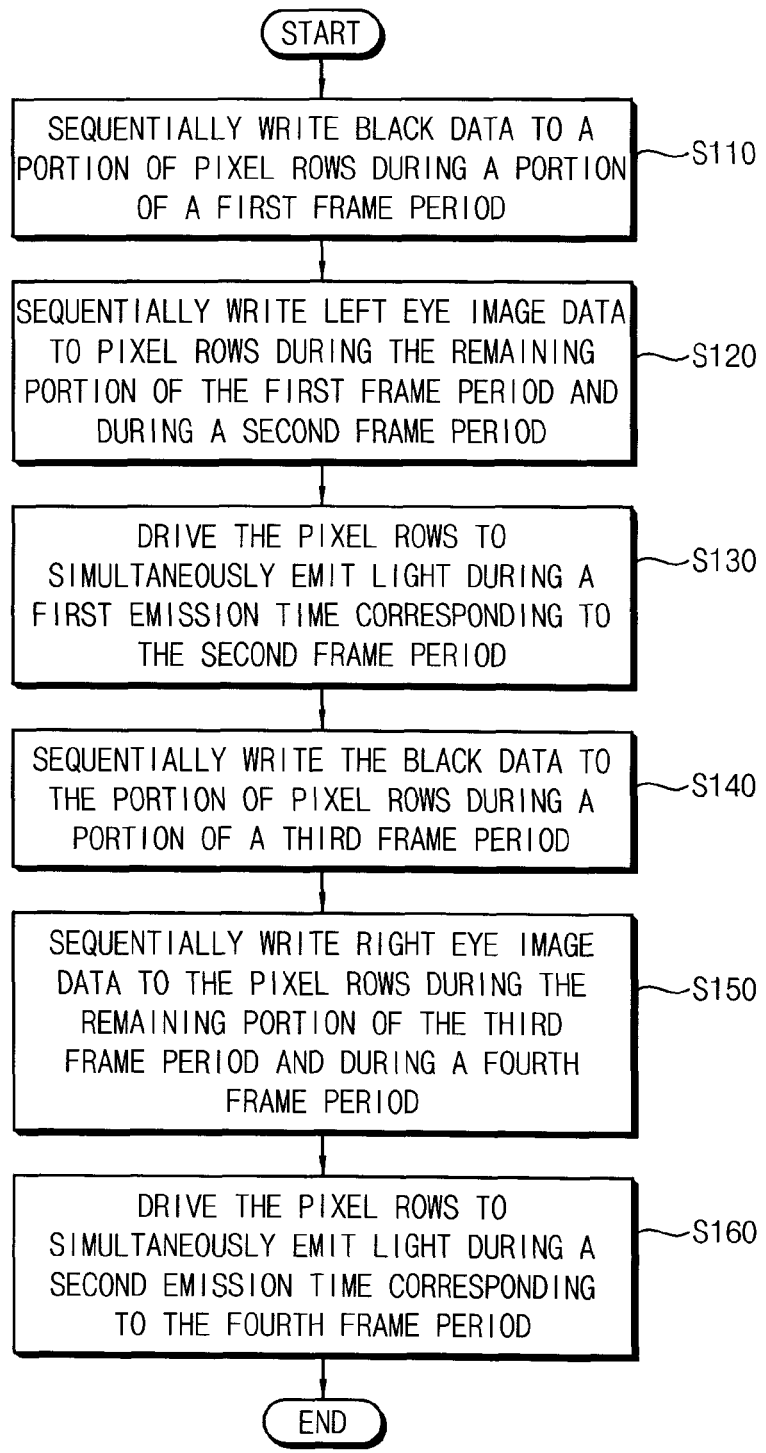
FIG. 1 is a flowchart illustrating a method of displaying a stereoscopic image according to example embodiments.

In the standard shutter glasses type display, crosstalk occurs between the left eye image and the right eye image when at least a portion of the right eye image is displayed while the left eye lens of the shutter glasses is open and/or at least a portion of the left eye image is displayed while the right eye lens of the shutter glasses is open.

Example embodiments are described more fully hereinafter with reference to the accompanying drawings Like or similar reference numerals refer to like or similar elements throughout.

FIG. 1 is a flowchart illustrating a method of displaying a stereoscopic image according to example embodiments.

Referring to FIG. 1, the method of displaying a stereoscopic image is performed at a display device having a display panel including a plurality of pixel rows. The method includes sequentially writing black data to a portion of the pixel rows during a portion of a first frame period (S110) and sequentially writing left eye image data to the pixel rows during the remaining portion of the first frame period and during a second frame period (S120). For example, while the same image data (e.g., the same left eye image data) is expected to be overwritten (or written twice) during two consecutive frame periods (e.g., the first frame period and the second frame period), during a portion (e.g., a portion of the first frame period) of the first one of the two consecutive frame periods, the black data is sequentially written instead of the image data (e.g., the left eye image data) to a portion of the pixel rows. Here, a pixel row refers to a row of pixels that are connected to the same scan line. The black data written to the portion of the pixel rows during the portion of the first frame period can prevent a left eye image from being displayed when the display of a right image is terminated or when a right eye lens of shutter glasses switches from an open state to a closed state.

The pixel rows substantially simultaneously emit light during a first emission time or first emission period corresponding to the second frame period (S130). While the display device operates in a stereoscopic mode (or a three-dimensional mode), data is written to the pixel rows in a progressive emission method (e.g., a progressive emission with simultaneous scan (PESS) method), and the pixel rows emit light in a simultaneous emission method. In some example embodiments, the emission or non-emission of the pixel rows is controlled based on a voltage difference between a high power supply voltage and a low power supply voltage applied to the pixel rows. In other example embodiments, the emission or non-emission of the pixel rows is controlled based on an emission control signal applied to the pixel rows.

The black data is sequentially written to the portion of the pixel rows during a portion of a third frame period (S140) and right eye image data is sequentially written to the pixel rows during the remaining portion of the third frame period and during a fourth frame period (S150). For example, while the same image data (e.g., the right or left eye image data) is expected to be overwritten (or written twice) during two consecutive frame periods (e.g., the third frame period and the fourth frame period), during a portion (e.g., a portion of the third frame period) of the first one of the two consecutive frame periods, the black data is sequentially written instead of the image data (e.g., the right eye image data) to the portion of the pixel rows. The black data written to the portion of the pixel rows during the portion of the third frame period can prevent a right eye image from being displayed when the display of a left image is terminated or when a left eye lens of shutter glasses switches from an open state to a closed state.

The pixel rows simultaneously emit light during a second emission time corresponding to the fourth frame period (S160).

The left eye image data or the right eye image data can be overwritten (or written twice) during two consecutive frame periods and the pixel rows can simultaneously emit light during the emission time corresponding to the second one of the two consecutive frame periods. Thus, although a data write operation (or a scan operation) is performed in the progressive emission method (e.g., the progressive emission with simultaneous scan (PESS) method), crosstalk between the left eye image and the right eye image can be substantially prevented. However, although the data write operation and the emission operation are performed as described above, the crosstalk between the left eye image and the right eye image may not be completely removed and the crosstalk may occur due to an emission end delay (e.g., a transition delay of a power supply voltage or a transition delay of an emission control signal) at an emission end time. For example, a time at which displaying the left eye image or the right eye image is terminated, or a time at which the left eye lens or the right eye lens of the shutter glasses switches from the open state to the closed state. However, in the method of displaying the stereoscopic image according to example embodiments, the black data instead of the left eye image data or the right eye image data is written to the portion of the plurality of pixel rows during a portion of the two consecutive frame periods, and thus the crosstalk between the left eye image and the right eye image at the time at which displaying the left eye image or the right eye image is terminated, or at the time at which the left eye lens or the right eye lens of the shutter glasses switches from the open state to the closed state can be substantially completely removed.

Figure 2:
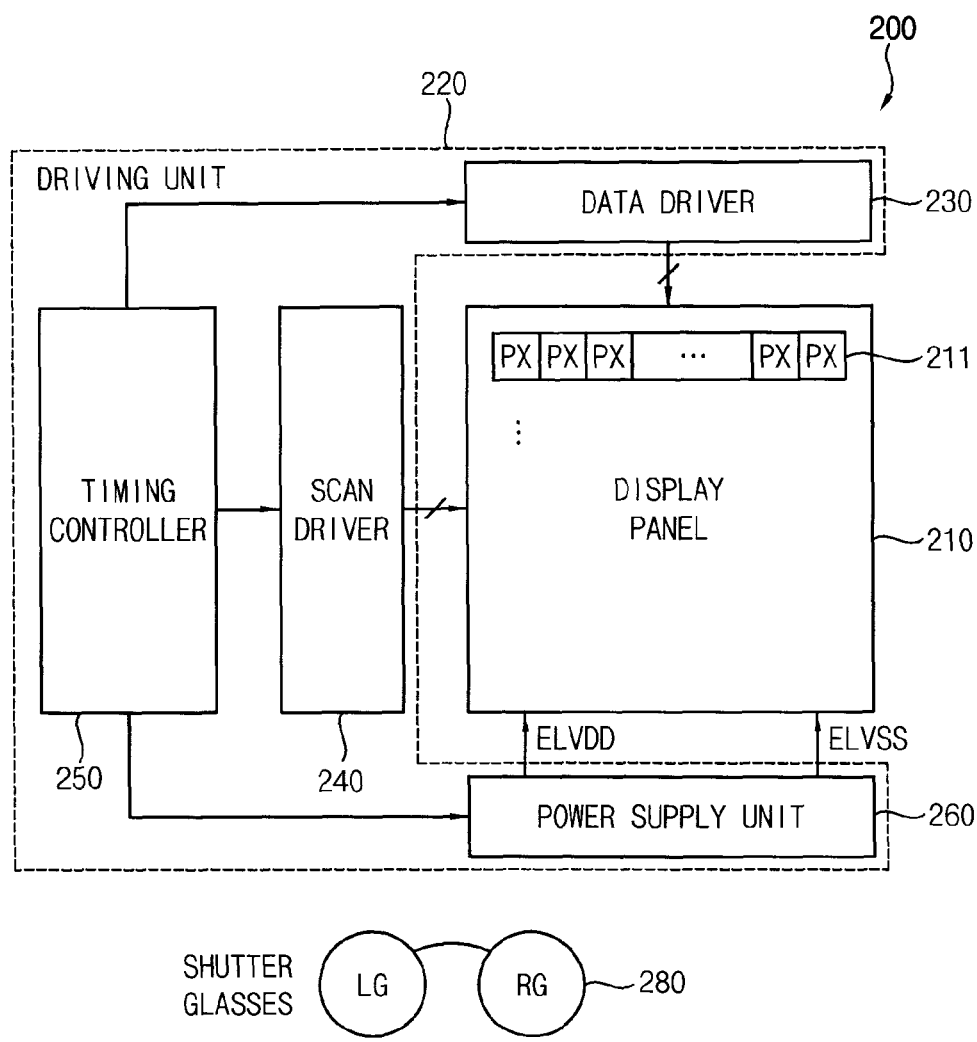
FIG. 2 is a block diagram illustrating a display device displaying a stereoscopic image according to example embodiments.
Figure 3:
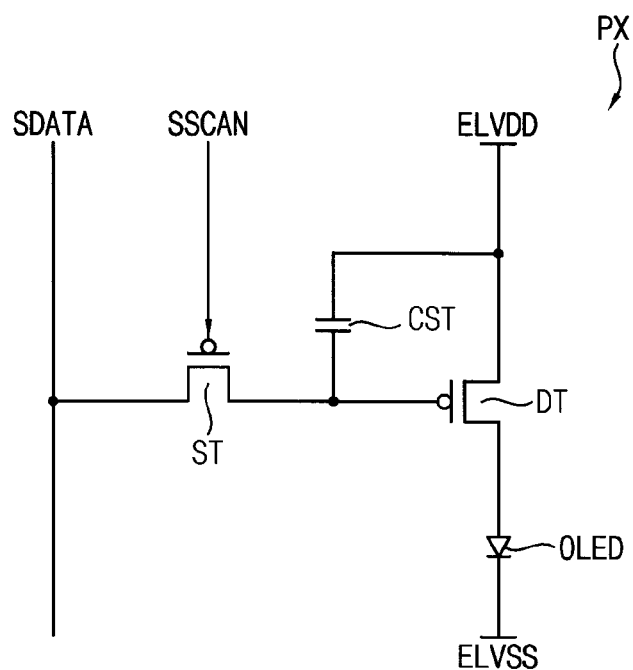
FIG. 3 is a circuit diagram illustrating an example of a pixel included in the display device of FIG. 2.
Figure 4A:
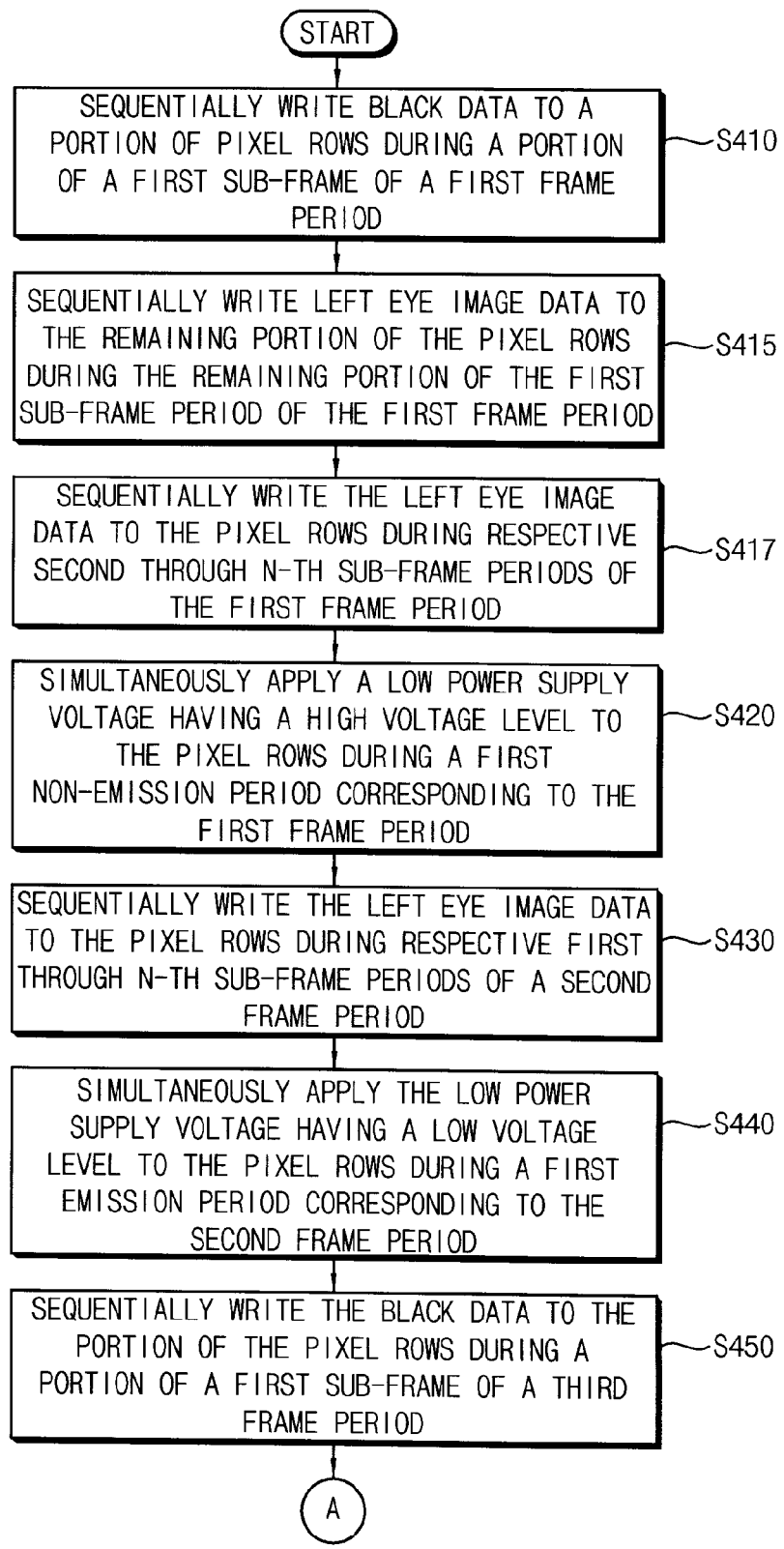
FIGS. 4A and 4B are a flowchart illustrating a method of displaying a stereoscopic image according to example embodiments.
Figure 4B:
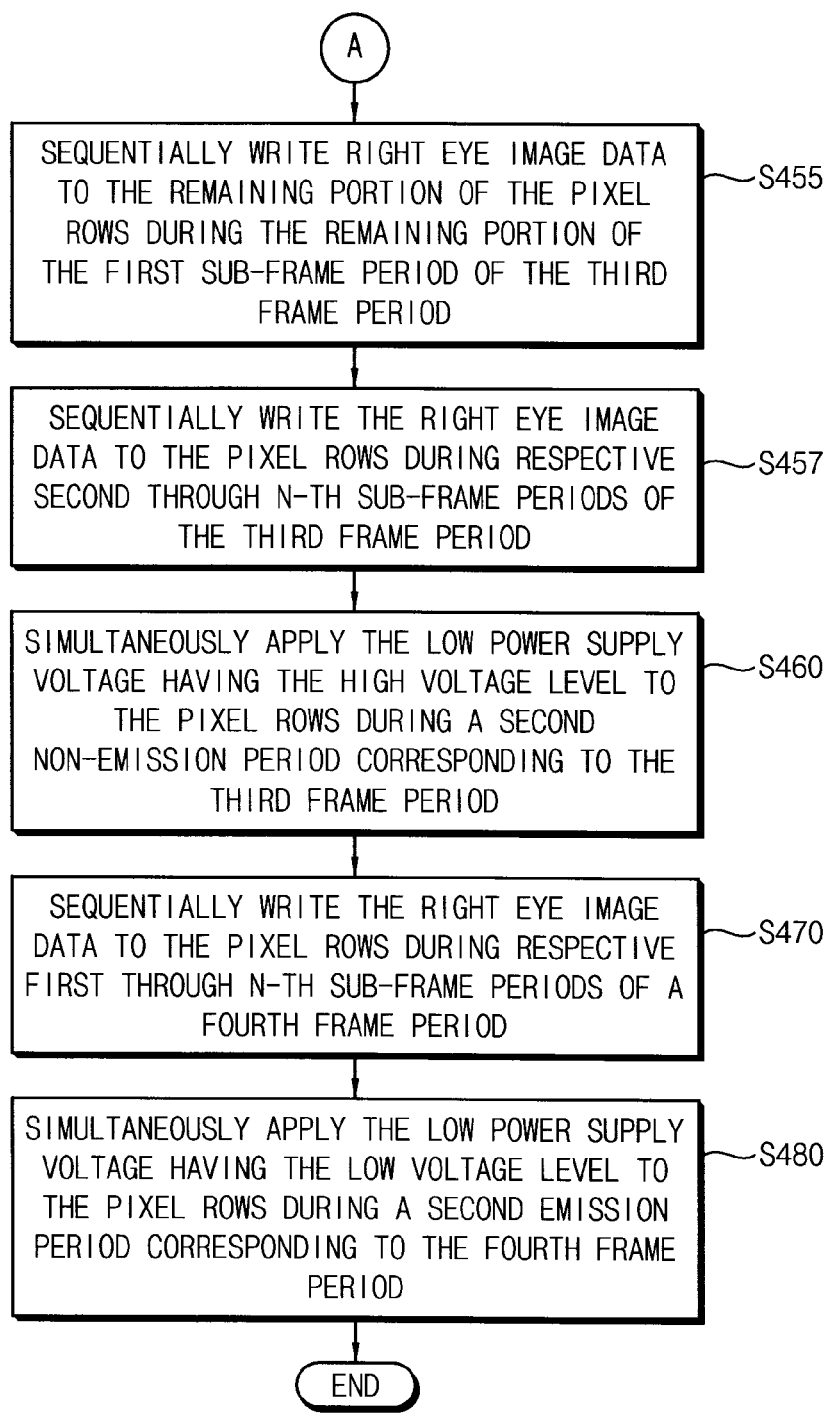
Figure 5:
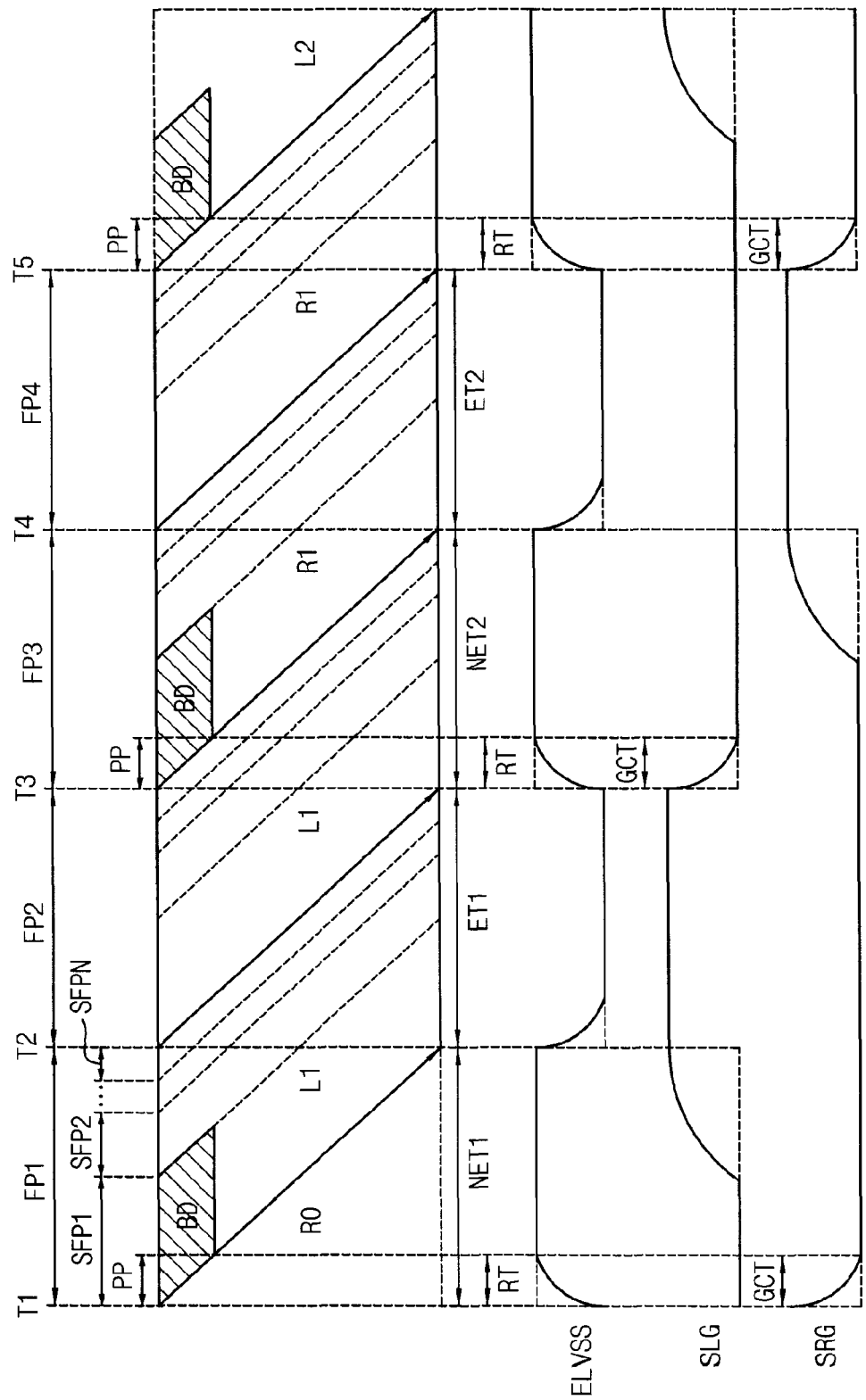
FIG. 5 is a timing diagram for describing an operation of a display device displaying a stereoscopic image according to example embodiments.

FIG. 2 is a block diagram illustrating a display device displaying a stereoscopic image according to example embodiments. FIG. 3 is a circuit diagram illustrating an example of a pixel included in the display device of FIG. 2. FIGS. 4A and 4B are a flowchart illustrating a method of displaying a stereoscopic image according to example embodiments. FIG. 5 is a timing diagram for describing an operation of a display device displaying a stereoscopic image according to example embodiments. FIG. 6 is a diagram for describing an example of a method of writing data to pixel rows in a display device according to example embodiments.

Referring to FIG. 2, the display device 200 includes a display panel 210 including a plurality of pixel rows 211 and a driving unit 220 that drives the display panel 210. The driving unit 220 includes a data driver 230, a scan driver 240, a timing controller 250 and a power supply unit 260. The display device 200 can operate in a three-dimensional mode (or a stereoscopic mode) and/or a two-dimensional mode and can display a stereoscopic image in the three-dimensional mode. In the three-dimensional mode, the display device 200 can operate in synchronization with shutter glasses 280.

The display panel 210 is connected to the data driver 230 of the driving unit 220 through a plurality of data lines and is connected to the scan driver 240 of the driving unit 220 through a plurality of scan lines. The display panel 210 includes the pixel rows 211. That is, the display panel 210 includes a plurality of pixels PX arranged in a matrix having a plurality of rows and a plurality of columns. One row of pixels PX connected to the same scan line is referred to as one pixel row 211. In some example embodiments, the display panel 210 is a self-emitting display panel that emits light without the use of a back light unit. For example, the display panel 210 may be an organic light-emitting diode (OLED) display panel.

In some example embodiments, as illustrated in FIG. 3, each pixel PX of the display panel 210 includes a switching transistor ST, a storage capacitor CST, a driving transistor DT and an OLED. The switching transistor ST has a first source/drain terminal connected to a data line, a second source/drain terminal connected to the storage capacitor CST, and a gate terminal connected to the scan line. The switching transistor ST transfers a data signal SDATA received from the data driver 230 to the storage capacitor CST in response to a scan signal SSCAN received from the scan driver 240. The storage capacitor CST stores the data signal SDATA transferred through the switching transistor ST. The driving transistor DT has a first source/drain terminal connected to a high power supply voltage ELVDD, a second source/drain terminal connected to the OLED, and a gate terminal connected to the storage capacitor CST. The driving transistor DT can be turned on or off according to the data signal SDATA stored in the storage capacitor CST. The OLED has an anode electrode connected to the driving transistor DT and a cathode electrode connected to a low power supply voltage ELVSS. The OLED can emit light based on a current flowing from the high power supply voltage ELVDD to the low power supply voltage ELVSS while the driving transistor DT is turned on. This simple structure of each pixel PX, or a 2T1C structure including two transistors ST and DT and one capacitor CST is one example of a pixel structure that is suitable for a large sized display device.

The driving unit 220 includes the data driver 230, the scan driver 240 and the timing controller 250. The data driver 230 applies a data signal (e.g., a signal corresponding to left eye image data, a signal corresponding to right eye image data, or a signal corresponding to black data) to the display panel 210 through the data lines. The scan driver 240 applies a scan signal to the display panel 210 through the scan lines. The timing controller 250 controls the operation of the display device 200. For example, the timing controller 250 provides predetermined control signals to the data driver 230 and the scan driver 240 to control the operations of the display device 200. In some example embodiments, the data driver 230, the scan driver 240 and the timing controller 250 are implemented as one integrated circuit (IC). In other example embodiments, the data driver 230, the scan driver 240 and the timing controller 250 are implemented as two or more integrated circuits.

The driving unit 220 further includes the power supply unit 260. The power supply unit 260 supplies the display panel 210 with a first power supply voltage (e.g., the high power supply voltage ELVDD) and a second power supply voltage (e.g., the low power supply voltage ELVSS). In some example embodiments, the power supply unit 260 controls the emission or non-emission of the display panel 210 by adjusting at least one of the high power supply voltage ELVDD and the low power supply voltage ELVSS. The power supply unit 260 provides the pixel rows 211 with the high and low power supply voltages ELVDD and ELVSS having a first voltage difference such that the pixel rows 211 do not emit light during a non-emission period and provides the pixel rows 211 with the high and low power supply voltages ELVDD and ELVSS having a second voltage difference greater than the first voltage difference such that the pixel rows 211 emit light during an emission period. For example, the first voltage difference may be about 0V and the second voltage difference may be a large enough voltage difference so as to enable the OLED to emit light.

Hereinafter, a method of displaying a stereoscopic image at the display panel 200 will be described below with reference to FIGS. 4A through 6.

Referring to FIGS. 2, 4A, 4B and 5, the driving unit 220 sequentially writes black data BD to a portion of the pixel rows 211 during a portion PP of a first frame period FP1 (S410). In some example embodiments, the driving unit 220 drives the display panel 210 by dividing one frame period (e.g., FP1) into a plurality of sub-frame periods SFP1, SFP2 and SFPN and sequentially writes the black data BD to the portion of the pixel rows 211 during a portion PP of a first sub-frame period SFP1 of the first frame period FP1 (S410). Since the black data BD is written to the portion of the pixel rows 211 during the portion PP of the first sub-frame period SFP1, while the displaying of a right eye image is terminated after the right eye image is displayed based on the previous right eye image data R0 displayed during a previous frame period, a left eye image corresponding to left eye image data L1 can be prevented from being displayed. That is, crosstalk between the left eye image and the right eye image at an emission end time can be prevented. In some example embodiments, to prevent the crosstalk at the emission end time, the portion PP of the first sub-frame period SFP1 during which the black data BD is written corresponds to an emission end delay period (e.g., a rising time RT of the low power supply voltage ELVSS). In other example embodiments, to prevent the crosstalk at the emission end time, the portion PP of the first sub-frame period SFP1 during which the black data BD is written corresponds to a glass close time or lens close period GCT, that is a period during which a left eye lens LG or a right eye lens RG of the shutter glasses 280 switches from an open state to a closed state.

The driving unit 220 sequentially writes left eye image data L1 to the pixel rows 211 during the remaining portion of the first frame period FP1 (S415 and S417). For example, the driving unit 220 sequentially writes the left eye image data L1 to the remaining portion of the pixel rows 211 (other than the portion of the pixel rows 211 to which the black data BD is written) during the remaining portion of the first sub-frame period SFP1 of the first frame period FP1 (other than the portion PP of the first sub-frame period SFP1 of the first frame period FP1) (S415). Further, the driving unit 220 sequentially writes the left eye image data L1 to the pixel rows 211 during the respective second through N-th sub-frame periods SFP2 and SFPN of the first frame period FP1, where N is an integer greater than 1 (S417).

During a first non-emission time or a first non-emission period NET1 corresponding to the first frame period FP1, the driving unit 220 applies the first power supply voltage (e.g., the high power supply voltage ELVDD) and the second power supply voltage (e.g., the low power supply voltage ELVSS) having the first voltage difference (S420) such that the pixel rows 211 do not emit light. Here, a frame period may be shifted (e.g., by one unit time in a PESS method) according to the pixel rows 211. For example, the first frame period FP1 may be a time period from a first time T1 to a second time T2 with respect to a pixel row (e.g., the top pixel row) to which a data write operation or a scan operation is performed first. The first frame period FP1 may also be a time period from the second time T2 (or a time near the second time T2) to a third time T3 (or a time near the third time T3) with respect to a pixel row (e.g., the bottom pixel row) to which the data write operation or the scan operation is performed last. Further, here, the non-emission time corresponding to a frame period represents a time period corresponding to the frame period of the pixel row (e.g., the top pixel row) to which the data write operation or the scan operation is performed first. For example, the first non-emission time NET1 corresponding to the first frame period FP1 is the time period from the first time T1 to the second time T2.

According to example embodiments, to control the simultaneous emission/non-emission of the pixel rows 211, the driving unit 220 adjusts the voltage level of at least one of the high power supply voltage ELVDD and the low power supply voltage ELVSS. In some example embodiments, the driving unit 220 increases the low power supply voltage ELVSS to a high voltage level at the start time of the first non-emission time NET1 such that the pixel rows 211 do not emit light. That is, the driving unit 220 applies the low power supply voltage ELVSS having the high voltage level simultaneously to the pixel rows 211 during the first non-emission time NET1 corresponding to the first frame period FP1 (S420). In other example embodiments, the driving unit 220 decreases the high power supply voltage ELVDD to a low voltage level at the start time of the first non-emission time NET1 such that the pixel rows 211 do not emit light.

The driving unit 220 sequentially writes the left eye image data L1 to the pixel rows 211 during a second frame period FP2 after the first time period FP1 (S430). For example, the driving unit 220 sequentially writes the left eye image data L1 to the pixel rows 211 during respective first through N-th sub-frame periods SFP1, SFP2 and SFPN of the second frame period FP2 (S430). That is, the driving unit 220 overwrites the same image data, or the same left eye image data L1 to the pixel rows 211 for the two consecutive frame periods (e.g., the first and second frame periods FP1 and FP2).

During a first emission time ET1 corresponding to the second frame period FP2, the driving unit 220 applies the first power supply voltage and the second power supply voltage having the second voltage difference (S440) such that the pixel rows 211 simultaneously emit light. Here, an emission period corresponding to a frame period is a time period corresponding to the frame period of the pixel row (e.g., the top pixel row) to which the data write operation or the scan operation is performed first. For example, the first emission time or emission period ET1 corresponding to the second frame period FP2 is the time period from the second time T2 to the third time T3. In some example embodiments, the driving unit 220 decreases the low power supply voltage ELVSS to a low voltage level at a start time of the emission time ET1 such that the pixel rows 211 simultaneously emit light. That is, the driving unit 220 applies the low power supply voltage ELVSS having the low voltage level simultaneously to the pixel rows 211 during the first emission time ET1 corresponding to the second frame period FP2 (S440). In other example embodiments, the driving unit 220 increases the high power supply voltage ELVDD to a high voltage level at the start time of the first emission time ET1 such that the pixel rows 211 simultaneously emit light.

While the display panel 210 displays the left eye image based on the left eye image data L1, the display device 200 or an electronic device including the display device 200 provides a left eye lens control signal having a first logic level to the shutter glasses 280 such that the left eye lens LG of the shutter glasses 280 is in an open state during the first emission time ET1. According to example embodiments, the display device 200 or the electronic device communicated via a wired or wireless connection with the shutter glasses 280 to provide the left eye lens control signal. To ensure that the left eye lens LG of the shutter glasses 280 is the an open state at a start time of the first emission time ET1, or at the second time T2, the left eye lens control signal having the first logic level is transferred to the shutter glasses 280 before the second time T2. Accordingly, during the first emission time ET1, the display panel 210 displays the left eye image based on the left eye image data L1 and the left eye lens LG of the shutter glasses 280 is open, thereby providing the left eye image to the left eye of a user.

The driving unit 220 sequentially writes the black data BD to the portion of the pixel rows 211 during a portion PP of a first sub-frame period SFP1 of a third frame period FP3 (S450). The driving unit 220 sequentially writes right eye image data R1 to the remaining portion of the pixel rows 211 during the remaining portion of the first sub-frame period SFP1 of the third frame period FP3 (S455). The driving unit 220 also sequentially writes the right eye image data R1 to the pixel rows 211 during respective second through N-th sub-frame periods SFP2 and SFPN of the third frame period FP3 (S457). Further, during a second non-emission time NET2 (e.g., a time period from the third time T3 to a fourth time T4) corresponding to the third frame period FP3, the driving unit 220 applies the high and low power supply voltages ELVDD and ELVSS having the first voltage difference (S460) such that the pixel rows 211 do not emit light. Since the black data BD is written to the portion of the pixel rows 211 during the portion PP of the first sub-frame period SFP1, while the display of the left eye image is terminated after the left eye image has been displayed based on previous left eye image data L1 during the previous frame period (e.g., the second frame period FP2), a right eye image corresponding to the right eye image data R1 can be prevented from being displayed. That is, crosstalk between the left eye image and the right eye image at an emission end time can be prevented.

In some example embodiments, to prevent the crosstalk at the emission end time, the portion PP of the first sub-frame period SFP1 during which the black data BD is written corresponds to an emission end delay period. For example, as illustrated in FIGS. 4A, 4B and 5, to control the display panel 210 to not emit light, the driving unit 220 increases the low power supply voltage ELVSS to the high voltage level at the third time T3 (i.e., an end time of the first emission time ET1 or a start time of the second non-emission time NET2). The voltage level increase of the low power supply voltage ELVSS may be delayed by a rising time of the low power supply voltage ELVSS from the low voltage level to the high voltage level, and thus the termination of the emission of the display panel 210 may be delayed by the rising time of the low power supply voltage ELVSS. Further, although the display device 200 or the electronic device provides the left eye lens control signal having a second logic level to the shutter glasses 280 at the third time T3 such that the left eye lens LG of the shutter glasses 280 switches to a closed state, the switch in states of the left eye lens LG may be delayed by the glass close time GCT that is a period during which the left eye lens LG switches from the open state to the closed state. Thus, in the standard display, the right eye image data R1 may be written to the display panel 210 during the emission end delay period or the rising time of the low power supply voltage ELVSS. However, in the display device 200 according to example embodiments, the black data BD is written to the portion of the pixel rows 211 during the portion PP of the third frame period FP3 corresponding to the rising time of the low power supply voltage ELVSS, thereby preventing the right eye image from being provided to the user through the left eye lens LG of the shutter glasses 280. In other example embodiments, to control the display panel 210 to not emit light, the driving unit 220 decreases the high power supply voltage ELVDD to the low voltage level at the third time T3. In this case, the portion PP of the third frame period FP3 corresponds to a falling time during which the high power supply voltage ELVDD falls from the high voltage level to the low voltage level. In still other example embodiments, the portion PP of the third frame period FP3 corresponds to the glass close time GCT of the left eye lens LG or the right eye lens RG of the shutter glasses 280.

The driving unit 220 sequentially writes the right eye image data R1 to the pixel rows 211 during respective first through N-th sub-frame periods SFP1, SFP2 and SFPN of a fourth frame period FP4 (S470). During a second emission time ET2 (e.g., a time period from the fourth time T4 to a fifth time T5) corresponding to the fourth frame period FP4, the driving unit 220 applies the low power supply voltage ELVSS having the low voltage level simultaneously to the pixel rows 211 (S480) such that the pixel rows 211 simultaneously emit light. Further, while the display panel 210 displays the right eye image based on the right eye image data R1, the display device 200 or the electronic device provides a right eye lens control signal having the first logic level to the shutter glasses 280 such that the right eye lens RG of the shutter glasses 280 is in the open state during the second emission time ET2. Accordingly, during the second emission time ET2, the display panel 210 displays the right eye image based on the right eye image data R1 and the right eye lens RG of the shutter glasses 280 is open, thereby providing the right eye image to the right eye of the user.

Subsequently, although the voltage level increase of the low power supply voltage ELVSS is delayed and the change in state of the right eye lens RG is delayed at a start time of the next frame period, the black data BD is written to the portion of the pixel rows 211 during a portion PP of the next frame period, and thus a left eye image corresponding to the next left eye image data L2 being provided through the right eye lens RG can be prevented.

In some example embodiments, the black data BD and the left eye image data L1 at the first frame period FP1, the left eye image data L1 at the second frame period FP2, the black data BD and the right eye image data R1 at the third frame period FP3, and the right eye image data R1 at the fourth frame period FP3 are written in a progressive emission with simultaneous scan (PESS) method. For example, in the display device 200, as illustrated in FIG. 6, a time period corresponding to one frame period is divided into a plurality of unit times UNIT1, UNIT2, UNIT3, UNIT4, UNIT5 and UNIT6 according to the vertical resolution of the display panel 210. Thus, the number of unit times UNIT1, UNIT2, UNIT3, UNIT4, UNIT5 and UNIT6 corresponding to one frame period may be the number of scan lines included in the display panel 210 or the number of the pixel rows 211. Further, each unit time UNIT1, UNIT2, UNIT3, UNIT4, UNIT5 and UNIT6 is divided into a plurality of partial times or sub-unit times, and the number of the partial times included in one unit time is the number of the sub-frame periods SFP1, SFP2 and SFPN included in one frame period. FIG. 6 illustrates an example where a display panel includes 6 pixel rows, and one frame includes 4 sub-frames. Accordingly, in the example of FIG. 6, the time period corresponding to one frame period is divided into 6 unit times UNIT1, UNIT2, UNIT3, UNIT4, UNIT5 and UNIT6 and each unit time UNIT1, UNIT2, UNIT3, UNIT4, UNIT5 and UNIT6 is divided into 4 partial times. In this embodiment, data corresponding to different sub-frames is written to different pixel rows at the partial times of each unit time UNIT1, UNIT2, UNIT3, UNIT4, UNIT5 and UNIT6, respectively, and data corresponding to each sub-frame is sequentially written to the 6 pixel rows while being delayed by one unit time with respect to the respective pixel rows. In this PESS method, since the respective data write times for all pixel rows are distributed throughout a time period corresponding to one frame period, each data write time can be sufficiently obtained. Accordingly, the PESS method may be suitable for large sized display devices having high resolution.

In the standard display device (e.g., a large sized display device) that performs the data write operation in the PESS method, crosstalk between a left eye image and a right eye image may occur when the display device displays a stereoscopic image. However, as described above, in the display device 200 according to example embodiments, the same image data can be overwritten during two respective consecutive frame periods and all pixel rows included in the display panel 210 simultaneously emit light during the emission period corresponding to the second one of the two consecutive frame periods, thereby preventing the crosstalk between the left eye image and the right eye image. Further, in the display device 200 according to example embodiments, since the black data is written to the portion of the pixel rows during a portion of the first one of the two consecutive frame periods, the crosstalk between the left eye image and the right eye image at the emission end time or at the glass close time can be substantially completely removed.

Figure 7:
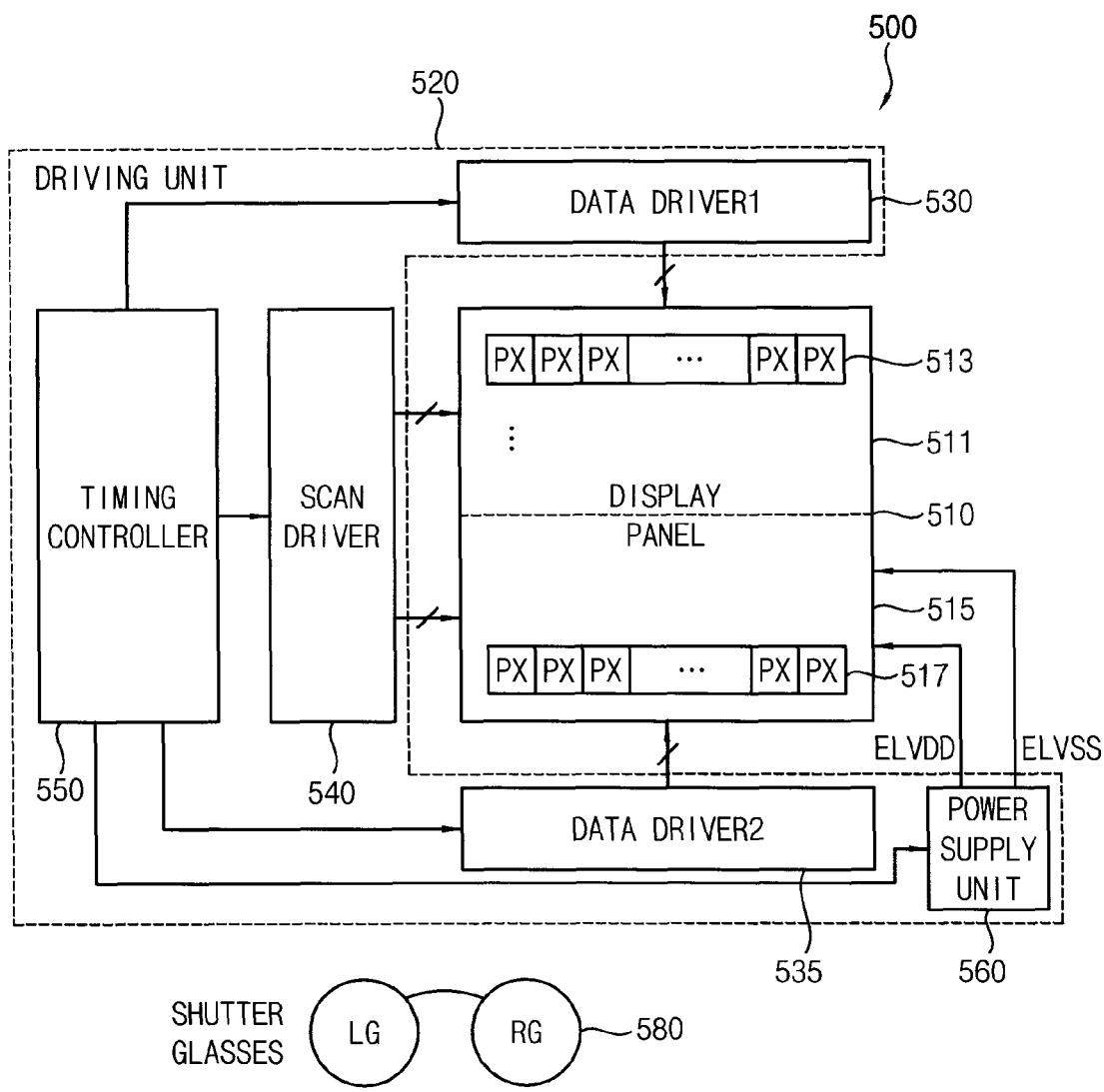
FIG. 7 is a block diagram illustrating a display device displaying a stereoscopic image according to example embodiments.
Figure 8:
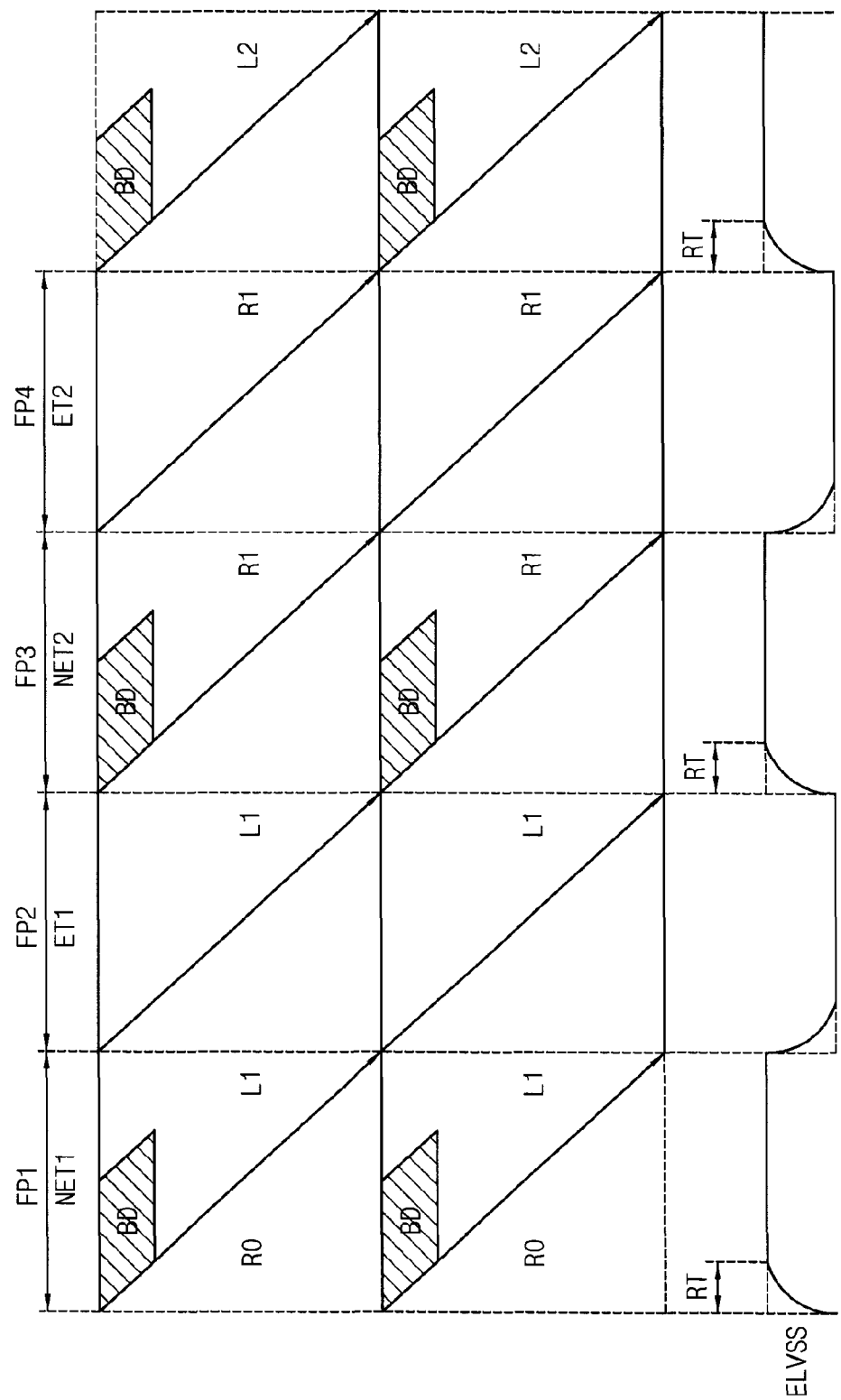
FIG. 8 is a timing diagram for describing an example of an operation of a display device displaying a stereoscopic image according to example embodiments.
Figure 9:
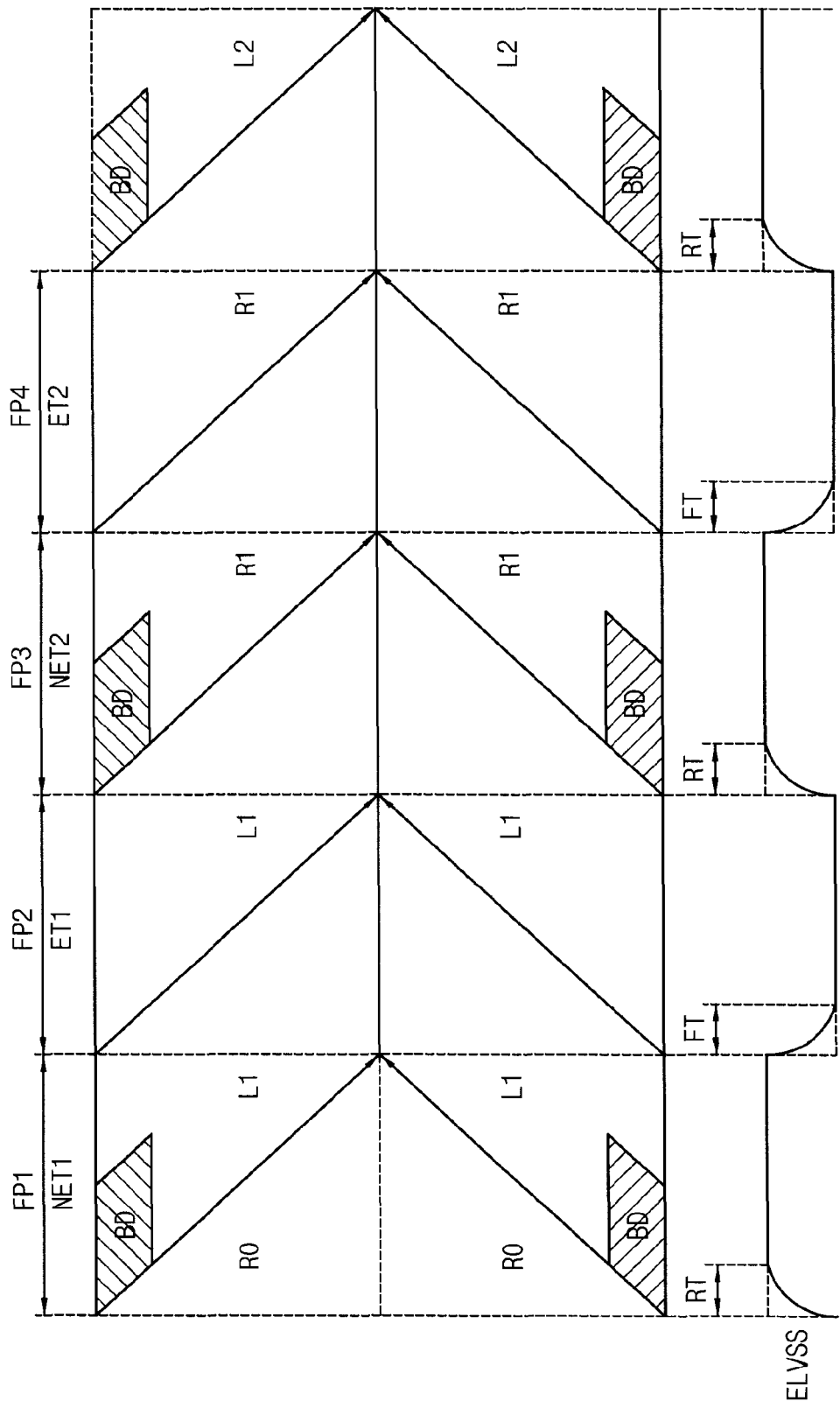
FIG. 9 is a timing diagram for describing another example of an operation of a display device displaying a stereoscopic image according to example embodiments.

FIG. 7 is a block diagram illustrating a display device displaying a stereoscopic image according to example embodiments. FIG. 8 is a timing diagram for describing an example of an operation of a display device displaying a stereoscopic image according to example embodiments. FIG. 9 is a timing diagram for describing another example of an operation of a display device displaying a stereoscopic image according to example embodiments.

Referring to FIG. 7, the display device 500 includes a display panel 510 including a plurality of pixel rows 513 and 517 and a driving unit 520 that drives the display panel 510. The driving unit 520 includes first and second data drivers 530 and 535, a scan driver 540, a timing controller 550 and a power supply unit 560. The display device 500 operates in a three-dimensional mode (or a stereoscopic mode) and/or a two-dimensional mode and displays a stereoscopic image in the three-dimensional mode. In the three-dimensional mode, the display device 500 operates in synchronization with shutter glasses 580. The display device 500 has a similar configuration to a display device 200 of FIG. 2, except that the display device 500 includes two data drivers 530 and 535 and the display panel 510 includes upper and lower display panels 511 and 515 that are respectively driven by the different data drivers 530 and 535.

The display panel 510 is divided into the upper display panel 511 including upper pixel rows 513 and the lower display panel 515 including lower pixel rows 517. The upper pixel rows 513 of the upper display panel 511 receive data signals from the first data driver 530 and the lower pixel rows 517 of the lower display panel 515 receive data signals from the second data driver 535. Thus, the upper pixel rows 513 are respectively driven by different data drivers 530 and 535. In some example embodiments, the scan driver 540 provides scan signals to the upper display panel 511 and the lower display panel 515. In other example embodiments, the display device 500 includes two scan drivers respectively providing the scan signals to the upper display panel 511 and the lower display panel 515.

In some example embodiments, as illustrated in FIG. 8, the driving unit 520 sequentially writes data (e.g., black data BD, left eye image data L1 and L2, right eye image data R1 and R2, or the like) to the upper pixel rows 513 in a first direction from the top to the bottom of the upper display panel 511 and sequentially writes data to the lower pixel rows 517 in the first direction from the top to the bottom of the lower display panel 515. For example, the first data driver 530 sequentially writes the black data BD and the left eye image data L1 to the upper pixel rows 513 in the first direction during a first frame period FP1. The first data driver 530 sequentially writes the left eye image data L1 to the upper pixel rows 513 in the first direction during a second frame period FP2 and sequentially writes the black data BD and the right eye image data R1 to the upper pixel rows 513 in the first direction during a third frame period FP3. The first data driver 530 also sequentially writes the right eye image data R1 to the upper pixel rows 513 in the first direction during a fourth frame period FP4. Further, the second data driver 535 sequentially writes the black data BD and the left eye image data L1 to the lower pixel rows 517 in the first direction during the first frame period FP1 and sequentially writes the left eye image data L1 to the lower pixel rows 517 in the first direction during the second frame period FP2. The second data driver 535 also sequentially write the black data BD and the right eye image data R1 to the lower pixel rows 517 in the first direction during the third frame period FP3 and sequentially writes the right eye image data R1 to the lower pixel rows 517 in the first direction during the fourth frame period FP4. As described above, since the first and second data drivers 530 and 535 write the black data BD to a portion of the upper pixel rows 513 and a portion of the lower pixel rows 517 during a portion of the first frame period FP1 and a portion of the third frame period FP3, crosstalk during a rising time of a lower power supply voltage ELVSS can be prevented.

In other example embodiments, as illustrated in FIG. 9, the driving unit 520 sequentially writes data to the upper pixel rows 513 in the first direction from the top to the bottom of the upper display panel 511 and sequentially writes data to the lower pixel rows 517 in a second direction from the bottom to the top of the lower display panel 515, opposite to the first direction. This data write operation or this scan operation performed in the directions from the top and the bottom of the display panel 510 to the center of the display panel 510 is referred to as a "Chevron scanning." In the display device 500 according to example embodiments, since the first and second data drivers 530 and 535 write the black data BD during the portion of the first frame period FP1 and the portion of the third frame period FP3, the crosstalk during the rising time of the lower power supply voltage ELVSS can be prevented. Further, by performing this Chevron scanning, a horizontal band at a low gray region caused by a mismatch between the rising time RT and the falling time FT of the lower power supply voltage ELVSS can be prevented from occurring at a center portion of the display panel 510 and instead occurs at the upper and lower portions of the display panel 510, thereby further improving the visibility or the image quality of the display panel 510.

Although FIGS. 8 and 9 illustrates examples of data write directions or scan directions, the data write directions or scan directions of the display device according to example embodiments are not limited thereto.

Figure 10:
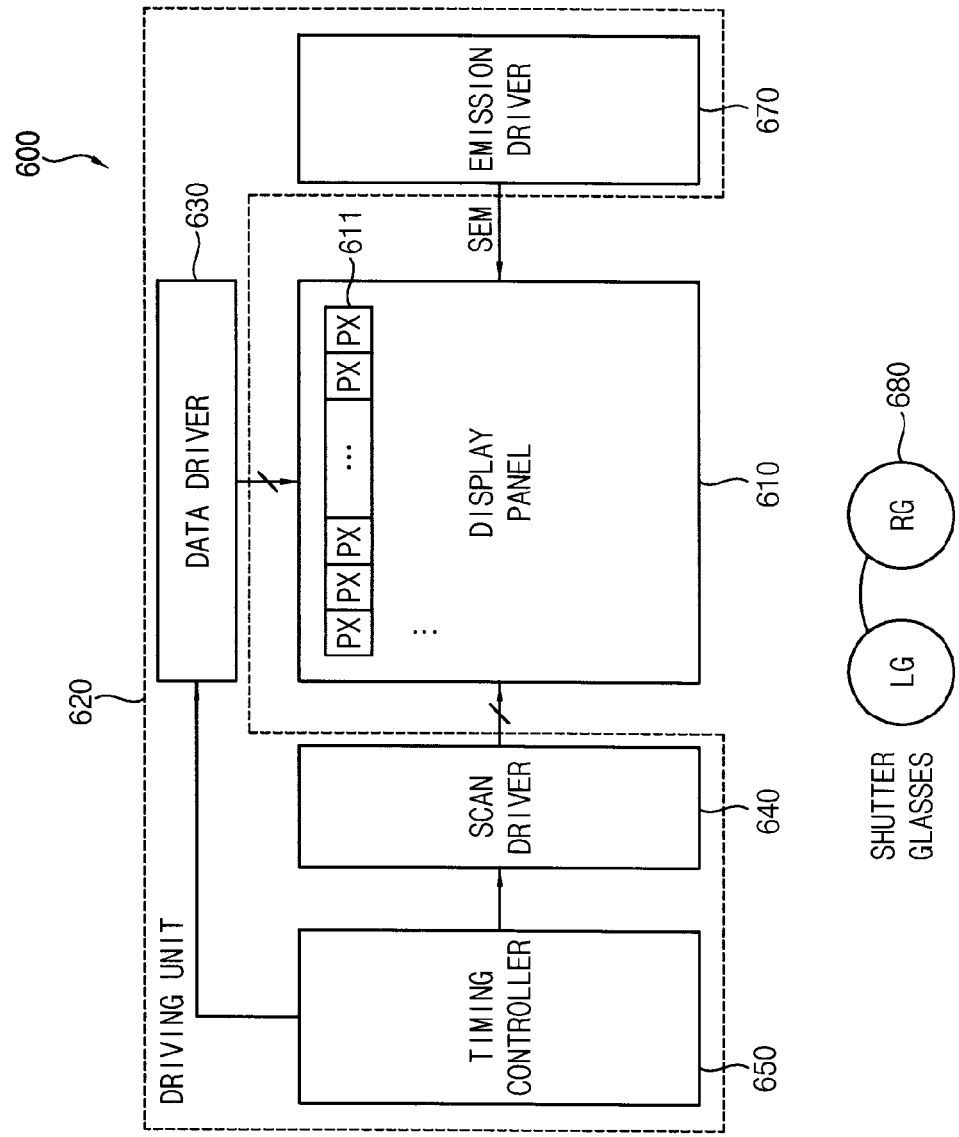
FIG. 10 is a block diagram illustrating a display device displaying a stereoscopic image according to example embodiments.
Figure 11:
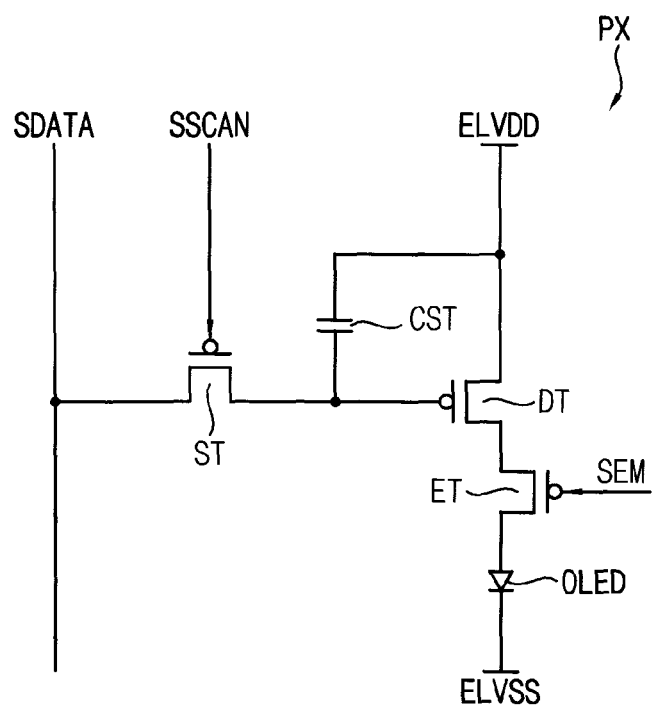
FIG. 11 is a circuit diagram illustrating an example of a pixel included in the display device of FIG. 10.
Figure 12A:
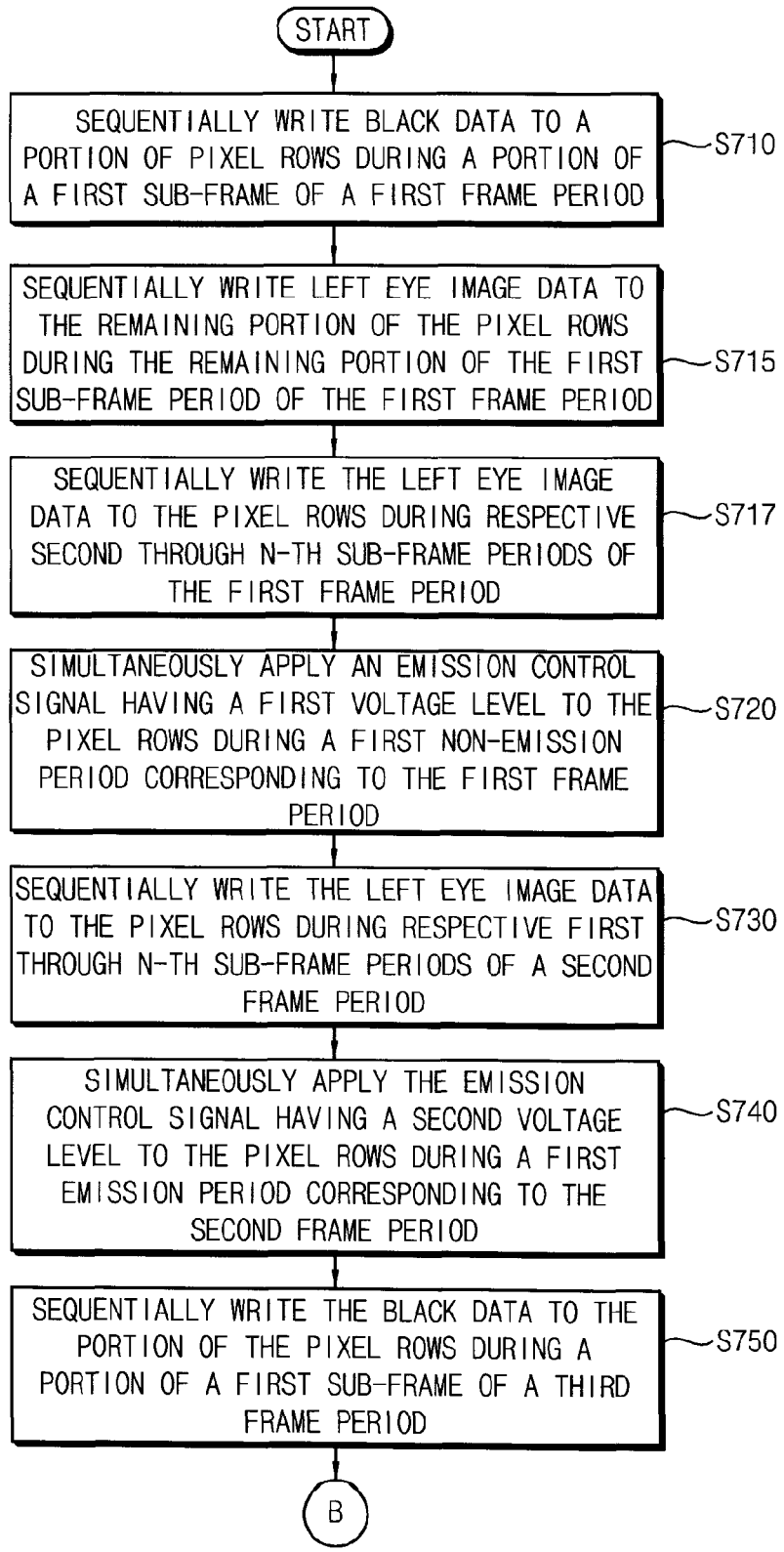
FIGS. 12A and 12B are a flowchart illustrating a method of displaying a stereoscopic image according to example embodiments.
Figure 12B:
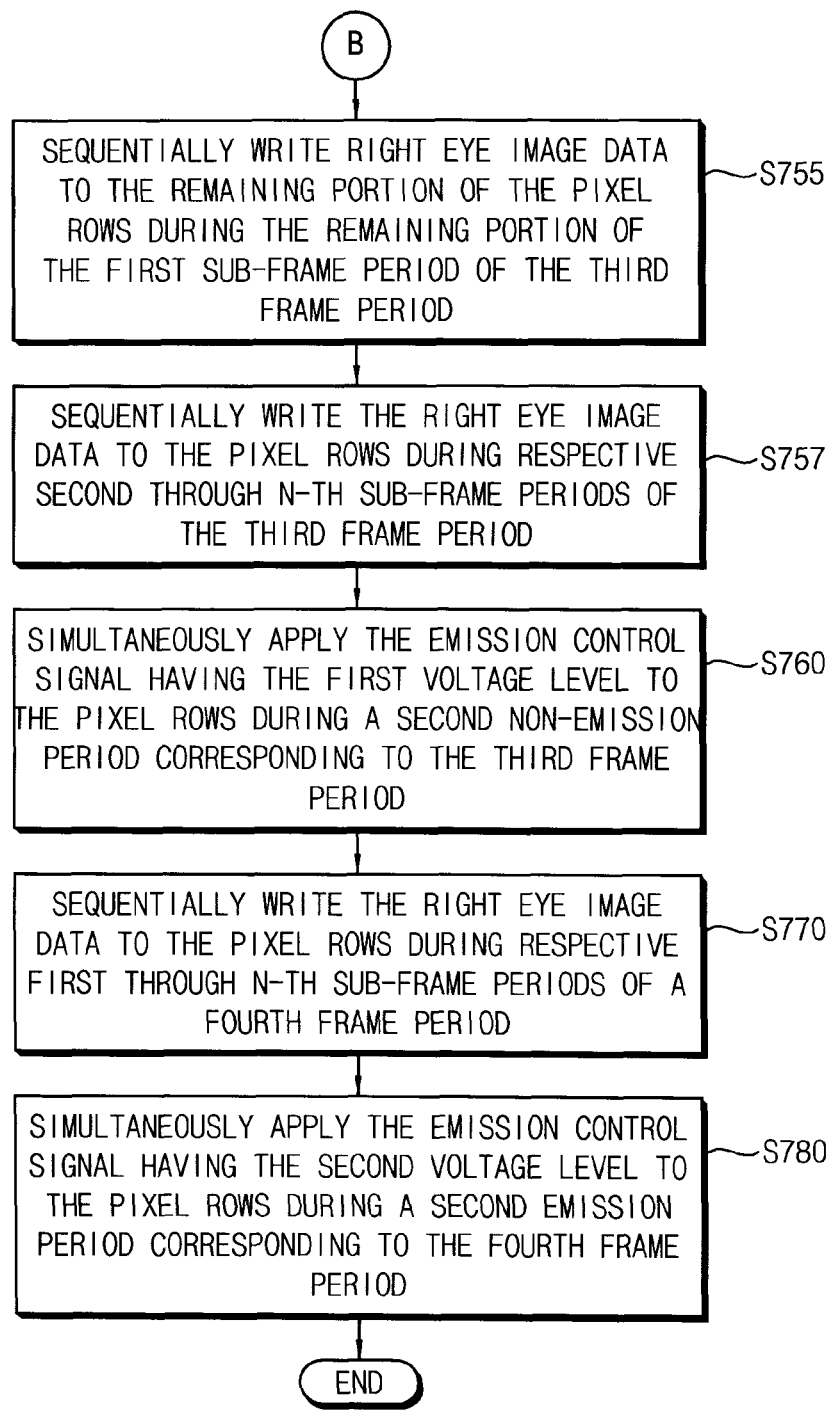
Figure 13:
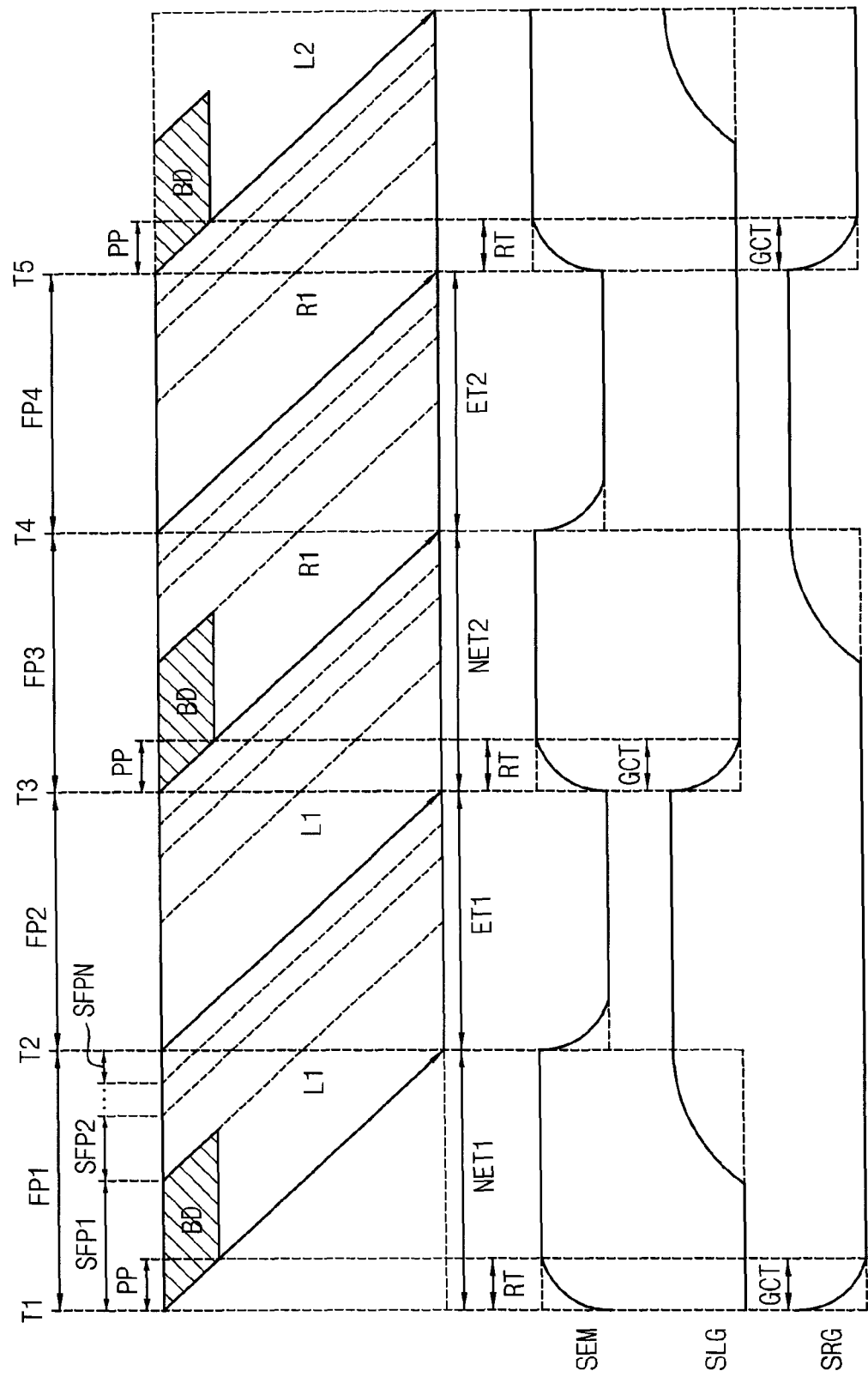
FIG. 13 is a timing diagram for describing an operation of a display device displaying a stereoscopic image according to example embodiments.

FIG. 10 is a block diagram illustrating a display device displaying a stereoscopic image according to example embodiments. FIG. 11 is a circuit diagram illustrating an example of a pixel included in the display device of FIG. 10. FIGS. 12A and 12B are a flowchart illustrating a method of displaying a stereoscopic image according to example embodiments. FIG. 13 is a timing diagram for describing an operation of a display device displaying a stereoscopic image according to example embodiments.

Referring to FIG. 10, the display device 600 includes a display panel 610 including a plurality of pixel rows 611 and a driving unit 620 that drives the display panel 610. The driving unit 620 includes a data driver 630, a scan driver 640, a timing controller 650 and an emission control unit or emission controller 670. The display device 600 operates in a three-dimensional mode (or a stereoscopic mode) and/or a two-dimensional mode and displays a stereoscopic image in the three-dimensional mode. In the three-dimensional mode, the display device 600 operates in synchronization with shutter glasses 680. The display device 600 has a similar configuration to the display device 200 of FIG. 2, except that the display device 600 includes the emission control unit 670 and that each pixel PX includes an emission control transistor. Although not illustrated in FIG. 10, the display device 600 may further include a power supply unit providing high and low power supply voltages to the display panel 610.

The emission control driver 670 simultaneously applies an emission control signal SEM to all pixels PX included in the display panel 610 to control the all pixels PX to simultaneously emit or not emit light. For example, the emission control driver 670 simultaneously applies the emission control signal SEM having a first voltage level to all pixels PX during a non-emission time such that the all pixels PX do not emit light and simultaneously applies the emission control signal SEM having a second voltage level to all pixels PX during an emission time such that the all pixels PX simultaneously emit light.

Each pixel PX emits or does not emit light in response to the emission control signal SEM. In some example embodiments, as illustrated in FIG. 11, each pixel PX includes a switching transistor ST, a storage capacitor CST, a drive transistor DT, an emission control transistor ET and an OLED. For example, the emission control transistor ET can be turned off in response to the emission control signal SEM having the first voltage level and can be turned on in response to the emission control signal SEM having the second voltage level. The OLED emits light based on a current flowing from the high power supply voltage ELVDD to the low power supply voltage ELVSS while the drive transistor DT and the emission control transistor ET are turned on.

Hereinafter, a method of displaying a stereoscopic image by the display panel 600 will be described below with reference to FIGS. 12A through 13. The method of displaying the stereoscopic image illustrated in FIGS. 12A and 12B is similar to the method of displaying a stereoscopic image illustrated in FIGS. 4A and 4B, except that the emission/non-emission of the display panel 610 is controlled not by a power supply voltage (e.g., the low power supply voltage ELVSS) but by the emission control signal SEM.

Referring to FIGS. 10, 12A, 12B and 13, the driving unit 620 sequentially writes black data BD to a portion of pixel rows 611 during a portion of a first sub-frame period SFP1 of a first frame period FP1 (S710) and sequentially writes left eye image data L1 to the remaining portion of the pixel rows 611 during the remaining portion of the first sub-frame period SFP1 of the first frame period FP1 (S715). The driving unit 620 also sequentially writes the left eye image data L1 to the pixel rows 611 during the respective second through N-th sub-frame periods SFP2 and SFPN of the first frame period FP1 (S717). Further, the driving unit 620 simultaneously applies the emission control signal SEM having the first voltage level to the pixel rows 611 during a first non-emission time NET1 corresponding to the first frame period FP1 (S720). For example, when the emission control transistor included in each pixel PX is a PMOS transistor, the first voltage level is a high voltage level.

The driving unit 620 sequentially writes the left eye image data L1 to the pixel rows 611 during respective first through N-th sub-frame periods SFP1, SFP2 and SFPN of a second frame period FP2 (S730). Further, the driving unit 620 simultaneously applies the emission control signal SEM having the second voltage level to the pixel rows 611 during a first emission time ET1 corresponding to the second frame period FP2 (S740). During the first emission time ET1, the display panel 610 displays a left eye image based on the left eye image data L1 and a left eye lens LG of the shutter glasses 680 is open, thereby providing the left eye image to a left eye of a user.

The driving unit 620 sequentially writes the black data BD to the portion of the pixel rows 611 during a portion of a first sub-frame period SFP1 of a third frame period FP3 (S750) and sequentially writes right eye image data R1 to the remaining portion of the pixel rows 611 during the remaining portion of the first sub-frame period SFP1 of the third frame period FP3 (S755). The driving unit also sequentially writes the right eye image data R1 to the pixel rows 611 during the respective second through N-th sub-frame periods SFP2 and SFPN of the third frame period FP3 (S757). Further, the driving unit 620 simultaneously applies the emission control signal SEM having the first voltage level to the pixel rows 611 during a second non-emission time NET2 corresponding to the third frame period FP3 (S760).

The driving unit 620 sequentially writes the right eye image data R1 to the pixel rows 611 during respective first through N-th sub-frame periods SFP1, SFP2 and SFPN of a fourth frame period FP4 (S770). Further, the driving unit 620 simultaneously applies the emission control signal SEM having the second voltage level to the pixel rows 611 during a second emission time ET2 corresponding to the fourth frame period FP4 (S780). During the second emission time ET2, the display panel 610 displays a right eye image based on the right eye image data R1 and a right eye lens RG of the shutter glasses 680 is open, thereby providing the right eye image to a right eye of the user.

The voltage level change of the emission control signal SEM at an end time of the first emission period ET1 or a time of the second emission period ET2 is delayed by a transition period (e.g., a rising time RT) of the emission control signal SEM from the second voltage level to the first voltage level. However, in the display device 600 according to example embodiments, since the black data BD is written to the portion of the pixel rows 611 during the portion PP of the first frame period FP1 or the portion of the third frame period FP3, crosstalk during the transition period (or the rising time RT) of the emission control signal SEM can be prevented.

Figure 14:
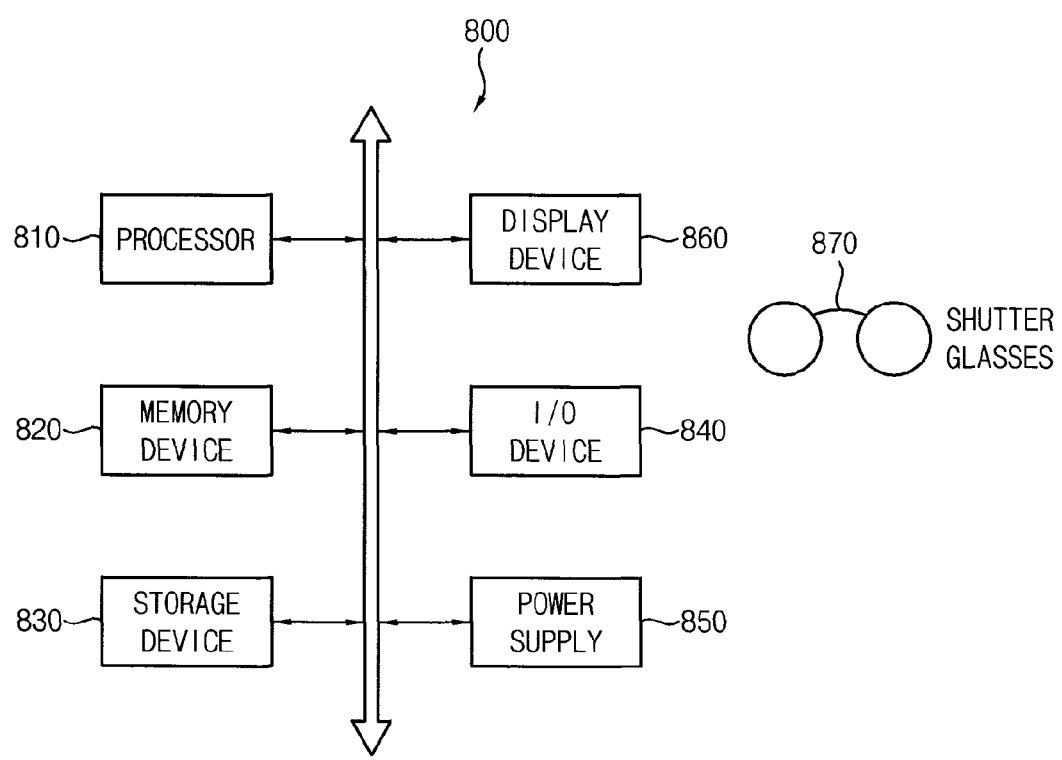
FIG. 14 is a block diagram illustrating an electronic device including a display device displaying a stereoscopic image according to example embodiments.

FIG. 14 is a block diagram illustrating an electronic device including a display device displaying a stereoscopic image according to example embodiments.

Referring to FIG. 14, the electronic device 800 includes a processor 810, a memory device 820, a storage device 830, an input/output (I/O) device 840, a power supply 850, and a display device 860 that can display a stereoscopic image. The electronic device 800 further includes a plurality of ports for communicating with a video card, a sound card, a memory card, a universal serial bus (USB) device, other electric devices, etc.

The processor 810 can perform various computing functions. The processor 810 may be a micro processor, a central processing unit (CPU), etc. The processor 810 can be connected to other components via an address bus, a control bus, a data bus, etc. Further, in some example embodiments, the processor 810 can be connected to an extended bus such as a peripheral component interconnection (PCI) bus.

The memory device 820 can store data for the operation of the electronic device 800. For example, the memory device 820 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile dynamic random access memory (mobile DRAM) device, etc.

The storage device 830 may be a solid state drive device, a hard disk drive device, a CD-ROM device, etc. The I/O device 840 may be an input device such as a keyboard, a keypad, a mouse, a touch screen, etc, and an output device such as a printer, a speaker, etc. In some example embodiments, the display device 860 may be included as the output device in the I/O device 840. The power supply 850 can supply power for operations of the electronic device 800. The display device 860 can communicate with other components via the buses or other communication links.

As described above, the display device 860 can implement a stereoscopic image by alternately providing a left eye image and a right eye image respectively to a left eye and a right eye. Further, the display device 860 can overwrite the same image data during two respective consecutive frame periods and can sequentially write black data to a portion of pixel rows during a portion of a first one of the two consecutive frame periods, thereby preventing crosstalk between the left eye image and the right eye image.

The described technology may be applied to any electronic device including a display device displaying a stereoscopic image. For example, the described technology may be applied to a television, a computer monitor, a laptop, a digital camera, a cellular phone, a smart phone, a personal digital assistant (PDA), a portable multimedia player (PMP), an MP3 player, a navigation system, a video phone, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the inventive technology. Accordingly, all such modifications are intended to be included within the scope of the invention as defined in the claims. Therefore, it is to be understood that the foregoing is illustrative of various example embodiments and is not to be construed as limited to the specific example embodiments disclosed and that modifications to the disclosed example embodiments, as well as other example embodiments, are intended to be included within the scope of the appended claims.

What is claimed is:

1. A method of displaying a stereoscopic image in a display device having a display panel including a plurality of pixel rows, the method comprising:
    sequentially writing black data to a portion of the pixel rows during a portion of a first frame period;
    sequentially writing left eye image data to 1) the remaining portion of the pixel rows written to during the portion of the first frame period, 2) the pixel rows written to during the remaining portion of the first frame period, and 3) the pixel rows written to throughout a second frame period;
    driving the pixel rows to simultaneously emit light during a first emission period corresponding to the second frame period;
    sequentially writing the black data to the portion of the pixel rows during a portion of a third frame period;
    sequentially writing right eye image data to the pixel rows during the remaining portion of the third frame period and during a fourth frame period; and
    driving the pixel rows to simultaneously emit light during a second emission period corresponding to the fourth frame period.

2. The method of claim 1, wherein each of the portions of the first and third frame periods corresponds to an emission end delay period.

3. The method of claim 1, wherein each frame period is divided into first through N-th sub-frame periods, where N is an integer greater than 1 and wherein the portion of the first frame period is a portion of the first sub-frame period of the first frame period.

4. The method of claim 3, wherein the sequentially writing the left eye image data to the pixel rows during the remaining portion of the first frame period and during the second frame period includes:
    sequentially writing the left eye image data to the remaining portion of the pixel rows during the remaining portion of the first sub-frame period of the first frame period;
    sequentially writing the left eye image data to the pixel rows during the second through N-th sub-frame periods of the first frame period; and
    sequentially writing the left eye image data to the pixel rows during the first through N-th sub-frame periods of the second frame period.

5. The method of claim 1, wherein the black data, the left eye image data and the right eye image data are written to the pixel rows via a progressive emission with simultaneous scan (PESS) method.

6. The method of claim 1, further comprising:
    applying first and second power supply voltages having a first voltage difference to the pixel rows i) during a first non-emission period corresponding to the first frame period and ii) during a second non-emission period corresponding to the third frame period such that the pixel rows do not emit light; and
    applying the first and second power supply voltages having a second voltage difference greater than the first voltage difference to the pixel rows i) during the first emission period and ii) during the second emission period such that the pixel rows emit light.

7. The method of claim 6, wherein the first power supply voltage is a high power supply voltage, wherein the second power supply voltage is a low power supply voltage, and wherein the method further comprises:
    raising the low power supply voltage rises to a high voltage level at a start time of the first non-emission period;
    lowering the lower power supply voltage to a low voltage level at a start time of the first emission period;
    raising the lower power supply voltage to the high voltage level at a start time of the second non-emission period; and
    lowering the lower power supply voltage to the low voltage level at a start time of the second emission period.

8. The method of claim 7, wherein each of the portions of the first and third frame periods corresponds to a rising time during which the low power supply voltage rises from the low voltage level to the high voltage level.

9. The method of claim 6, wherein the first power supply voltage is a high power supply voltage, wherein the second power supply voltage is a low power supply voltage, and wherein the method further comprises:
    lowering the high power supply voltage to a low voltage level at a start time of the first non-emission period;
    raising the high power supply voltage to a high voltage level at a start time of the first emission period;
    lowering the high power supply voltage to the low voltage level at a start time of the second non-emission period; and
    raising the high power supply voltage to the high voltage level at a start time of the second emission period.

10. The method of claim 9, wherein each of the portions of the first and third frame periods corresponds to a falling time during which the high power supply voltage falls from the high voltage level to the low voltage level.

11. The method of claim 1, further comprising:
applying an emission control signal having a first voltage level to the pixel rows i) during a first non-emission period corresponding to the first frame period and ii) during a second non-emission period corresponding to the third frame period such that the pixel rows do not emit light; and
applying the emission control signal having a second voltage level to the pixel rows i) during the first emission period and ii) during the second emission period such that the pixel rows emit light.

12. The method of claim 11, wherein each of the portions of the first and third frame periods corresponds to a transition time during which the emission control signal transitions from the second voltage level to the first voltage level.

13. The method of claim 1, wherein the display panel includes an upper display panel having upper pixel rows of the pixel rows and a lower display panel having lower pixel rows of the pixel rows and wherein the upper display panel and the lower display panel are respectively driven by different data drivers.

14. The method of claim 13, wherein the black data, the left eye image data and the right eye image data are sequentially written to the upper pixel rows in a first direction from the top to the bottom of the upper display panel and wherein the black data, the left eye image data and the right eye image data are sequentially written to the lower pixel rows in the first direction from the top to the bottom of the lower display panel.

15. The method of claim 13, wherein the black data, the left eye image data and the right eye image data are sequentially written to the upper pixel rows in a first direction from the top to the bottom of the upper display panel and wherein the black data, the left eye image data and the right eye image data are sequentially written to the lower pixel rows in a second direction from the bottom to the top of the lower display panel.

16. A display device, comprising:
a display panel including a plurality of pixel rows; and
a driving unit configured to:
sequentially write black data to a portion of the pixel rows during a portion of a first frame period;
sequentially writing left eye image data to 1) the remaining portion of the pixel rows written to during the portion of the first frame period, 2) the pixel rows written to during the remaining portion of the first frame period, and 3) the pixel rows written to throughout a second frame period;
drive the pixel rows to simultaneously emit light during a first emission period corresponding to the second frame period;
sequentially write the black data to the portion of the pixel rows during a portion of a third frame period;
sequentially write right eye image data to the pixel rows during the remaining portion of the third frame period and during a fourth frame period; and
drive the pixel rows to simultaneously emit light during a second emission period corresponding to the fourth frame period.

17. The display device of claim 16, wherein each of the portions of the first and third frame periods corresponds to an emission end delay period.

18. The display device of claim 16, wherein the driving unit includes:
a power supply configured to:
apply first and second power supply voltages having a first voltage difference to the pixel rows i) during a first non-emission period corresponding to the first frame period and ii) during a second non-emission period corresponding to the third frame period such that the pixel rows do not emit light; and
apply the first and second power supply voltages having a second voltage difference greater than the first voltage difference to the pixel rows i) during the first emission period and ii) during the second emission period such that the pixel rows emit light,
wherein each of the portions of the first and third frame periods corresponds to a transition time of at least one of the first and second power supply voltages.

19. The display device of claim 16, wherein the driving unit includes:
an emission controller configured to:
apply an emission control signal having a first voltage level to the pixel rows i) during a first non-emission period corresponding to the first frame period and ii) during a second non-emission period corresponding to the third frame period such that the pixel rows do not emit light; and
apply the emission control signal having a second voltage level to the pixel rows i) during the first emission period and ii) during the second emission period such that the pixel rows emit light,
wherein each of the portions of the first and third frame periods corresponds to a transition time during which the emission control signal transitions from the second voltage level to the first voltage level.

20. The display device of claim 16, wherein the display panel includes an upper display panel having upper pixel rows of the pixel rows and a lower display panel having lower pixel rows of the pixel rows, wherein the driving unit includes two data drivers respectively configured to drive the upper display panel and the lower display panel, wherein the black data, the left eye image data and the right eye image data are sequentially written to the upper pixel rows in a first direction from the top to the bottom of the upper display panel, and wherein the black data, the left eye image data and the right eye image data are sequentially written to the lower pixel rows in a second direction from the bottom to the top of the lower display panel.

* * * * *